(12) United States Patent
Truax et al.

(10) Patent No.: US 12,555,694 B2
(45) Date of Patent: Feb. 17, 2026

(54) FUEL HANDLING SYSTEM, LAYOUT, AND PROCESS FOR NUCLEAR REACTOR

(71) Applicant: TerraPower, LLC, Bellevue, WA (US)

(72) Inventors: John E. Truax, Bellevue, WA (US); Trevor R. McWilliams, Barnhart, MO (US)

(73) Assignee: TERRAPOWER, LLC, Bellevue, WA (US)

( * ) Notice: Subject to any disclaimer, the term of this patent is extended or adjusted under 35 U.S.C. 154(b) by 600 days.

(21) Appl. No.: 17/863,346

(22) Filed: Jul. 12, 2022

(65) Prior Publication Data

US 2023/0024749 A1 Jan. 26, 2023

Related U.S. Application Data

(63) Continuation-in-part of application No. 17/226,062, filed on Apr. 8, 2021, now Pat. No. 12,387,856.
(Continued)

(51) Int. Cl.
*G21C 19/19* (2006.01)
*G21C 19/08* (2006.01)
*G21C 19/32* (2006.01)

(52) U.S. Cl.
CPC .............. *G21C 19/32* (2013.01); *G21C 19/08* (2013.01); *G21C 19/19* (2013.01)

(58) Field of Classification Search
USPC ................................................. 376/268–271
See application file for complete search history.

(56) References Cited

U.S. PATENT DOCUMENTS

| | | | | |
|---|---|---|---|---|
| 2,778,792 A | * | 1/1957 | Szilard | G21C 19/20 134/28 |
| 2,845,762 A | * | 8/1958 | Kelman | G21C 3/20 976/DIG. 286 |

(Continued)

FOREIGN PATENT DOCUMENTS

| | | |
|---|---|---|
| FR | 2276664 A1 | 3/1979 |
| GB | 1550978 A | 8/1979 |

(Continued)

OTHER PUBLICATIONS

Chikazawa et al., JSFR key technology evaluation on fuel handling system, Journal of Nuclear Science and Technology, 51:4, 437-447, Jan. 7, 2014.
(Continued)

*Primary Examiner* — Lily C Garner
(74) *Attorney, Agent, or Firm* — FisherBroyles, LLP; Jeremy P. Sanders

(57) ABSTRACT

A method of handling spent nuclear fuel assemblies immerses the spent nuclear fuel assemblies in water in a relatively short time period when compared to traditional methods. A spent nuclear fuel assembly is removed from a nuclear reactor core, inserted into a sodium removal machine having a receiver, a cleaning vessel, and an elevator. A cleaning fluid is applied to the cleaning vessel and fuel assembly, and the fuel assembly is flushed with water while in the cleaning vessel. The cleaning vessel is at least partially submerged in the spent fuel pool during cleaning to provide passive heat removal. The cleaning vessel is lowered by an elevator into the spent fuel pool. The fuel assembly may then be loaded into a rack and/or a cask for long-term storage.

11 Claims, 26 Drawing Sheets

Related U.S. Application Data

(60) Provisional application No. 63/066,783, filed on Aug. 17, 2020.

(56) References Cited

U.S. PATENT DOCUMENTS

| | | | |
|---|---|---|---|
| 3,206,366 | A | 9/1965 | Ernst |
| 3,474,813 | A * | 10/1969 | Servanty ............... G21C 19/04 |
| | | | 976/DIG. 188 |
| 3,533,911 | A * | 10/1970 | Ringsmuth ............ G21C 19/02 |
| | | | 976/DIG. 257 |
| 3,952,885 | A | 4/1976 | Schabert et al. |
| 3,984,345 | A | 10/1976 | Heylen et al. |
| 4,002,529 | A * | 1/1977 | Andrea ................... G21C 19/08 |
| | | | 976/DIG. 259 |
| 4,062,723 | A * | 12/1977 | Andrea ................... G21C 19/20 |
| | | | 376/268 |
| 4,366,113 | A | 12/1982 | Gigou |
| 8,737,559 | B2 | 5/2014 | Singh |
| 11,217,353 | B2 | 1/2022 | Singh |
| 2014/0072087 | A1 | 3/2014 | Falcone et al. |
| 2016/0035444 | A1 | 2/2016 | Singh et al. |
| 2023/0298775 | A1* | 9/2023 | Robertson ............... G21C 19/18 |
| | | | 376/264 |

FOREIGN PATENT DOCUMENTS

| | | | |
|---|---|---|---|
| JP | S54138994 | A | 10/1979 |
| JP | S62129795 | A | 6/1987 |
| JP | S62235596 | A * | 10/1987 |
| JP | H0638118 | B2 | 5/1994 |
| JP | H1010294 | A * | 1/1998 |
| JP | 2933951 | B2 | 8/1999 |
| JP | 2003121587 | A | 4/2003 |
| KR | 20190026515 | A * | 3/2019 |
| RU | 2377673 | C2 | 12/2009 |
| WO | 2022039794 | A1 | 2/2022 |

OTHER PUBLICATIONS

PCT/US2021/026493 International Search Report and Written Opinion dated Feb. 7, 2021; 8 pages.

Borisch, "Theoretical Analysis of Sodium Removal from Fast Flux Test Facility Fuel Subassemblies", ASTM International, 1973, pp. 165-174.

PCT/US2023/069839 International Preliminary Report on Patentability issued Mar. 1, 2025.

Furukawa, Kazuo, "Liquid Sodium Technology (II)—For Development of fast-breeder reactor", PP221261. With English Translation Description.

* cited by examiner

FUEL HANDLING SYSTEM, LAYOUT, AND PROCESS FOR NUCLEAR REACTOR

CROSS-REFERENCE TO RELATED APPLICATIONS

This application is a continuation-in-part of, and claims the benefit of, U.S. application Ser. No. 17/226,062 filed Apr. 8, 2021, which claims priority to U.S. Provisional Patent Application No. 63/066,783, filed Aug. 17, 2020, both of which are entitled "FUEL HANDLING SYSTEM, LAYOUT, AND PROCESS FOR NUCLEAR REACTOR," the contents of each of which are incorporated herein by reference in its entirety.

GOVERNMENT LICENSE RIGHTS

This invention was made with government support under DOE Cooperative Agreement No. DE-NE0009054 awarded by the U.S. Department of Energy. The government has certain rights in the invention.

BACKGROUND

The field of the present disclosure is related to fuel handling systems, layouts, and processes for one or more nuclear reactors. Removing sodium from irradiated sodium fast reactor core components has historically been a bottleneck in the disposition of fuel and non-fuel sodium reactor irradiated core components.

It would be advantageous to process irradiated core components much more effectively and quickly to increase safety and efficiency. These, and other features and benefits, will be readily discernible to those of skill in the art by reference to the below discussion of the related problems and the proposed solutions.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. According to some embodiments, a method of storing a discharged core assembly includes the steps of coupling a cleaning vessel to a fueling floor valve; inserting, through the fueling floor valve and into the cleaning vessel, a discharged core assembly; introducing a cleaning fluid into the cleaning vessel, conveying the cleaning vessel and core assembly down an elevator into a spent fuel pool, and positioning the core assembly in the spent fuel pool for storage. Other embodiments of this aspect may include corresponding computer systems, apparatus, and computer programs recorded on one or more computer storage devices, each configured to perform the actions of the methods.

The method may further include the step of introducing a cleaning fluid accomplished by gradually increasing a moisture content in an inert gas. The method may include the step of filling the cleaning vessel with water to react residual sodium with the water. In some cases, coupling the cleaning vessel to the fueling floor valve creates a pressure seal and introducing the cleaning fluid may be performed under pressure. The method may further include the step of positioning the cleaning vessel at least partially in the spent fuel pool during the step of introducing the cleaning fluid into the cleaning vessel to provide passive cooling of the cleaning vessel to the spent fuel pool.

The method may include the step of loading the core assembly into a trolley and moving the trolley from a first position underneath the elevator to a second location within the spent fuel pool. The method may include the step of flushing the core assembly with water in a first flow direction after introducing the cleaning fluid. The method may further include the step of flushing the core assembly with water in a second flow direction, the second flow direction opposite that of the first flow direction, which may be termed a reverse-flow of fluid. The method may include the step of measuring a hydrogen concentration and determining, based on the measured hydrogen concentration being below a threshold value, that the cleaning has been completed. For example, during the cleaning step, the residual sodium will react with water and generate hydrogen. The level of hydrogen concentration can be used to determine when the residual sodium has fully reacted with water. As the residual sodium nears complete reaction with water, the hydrogen concentration will approach zero. In some embodiments, the method of cleaning may include determining that the hydrogen concentration is below a threshold value, which may be a non-zero concentration.

The method may include removing the core assembly from the cleaning vessel for storage and inserting a second core assembly into the cleaning vessel. For instance, the cleaning vessel may be reused for multiple core assemblies.

According to some embodiments, a sodium removal machine is provided for cleaning a discharged core assembly. The sodium removal machine may include a receiver coupled to a fueling floor valve, the receiver having one or more process fluid couplings; a cleaning vessel, the cleaning vessel having an open upper end and a closed lower end; and an elevator configured to convey the cleaning vessel from an upper position in which the cleaning vessel is coupled to the receiver, and a lower position in which the cleaning vessel is not coupled to the receiver.

In some embodiments, the receiver is static and, when coupled to the cleaning vessel, creates an enclosed boundary for the discharged core assembly. In some cases, the receiver is statically coupled to the fueling floor valve and the process fluid connections are likewise static within the receiver. When the cleaning vessel is coupled to the receiver, the process fluid connections are positioned to add or remove fluid from within the cleaning vessel. The cleaning vessel may include a receptacle configured to receive a portion of the discharged core assembly, the receptacle configured to form a seal with the portion of the discharged core assembly. In some cases, the receptacle is a hole and the portion of the core assembly is a nozzle that fits through the hole. The one or more process fluid couplings may include a process fluid inlet positioned above the cleaning vessel, such that process fluid passing through the process fluid inlet enters the cleaning vessel and core assembly. The receiver may have a first cross-sectional dimension, and the core assembly may have a second cross-sectional dimension, and the first cross-sectional dimension is less than twice the second cross-sectional dimension, or less than 50% larger than the second cross-sectional dimension. In some cases, the receiver has a first length, and the core assembly has a second length, and the first length may be less than two times the second length.

According to some embodiments, the elevator selectively couples with the cleaning vessel, and in some cases, the elevator automatically decouples from the cleaning vessel when the elevator is in the lower position.

In some examples, the cleaning vessel is at least partially submerged in a spent fuel pool when the elevator is at the upper position. This configuration allows for passive cooling of the cleaning vessel to the spent fuel pool. The sodium removal machine may include a hydrogen sensor, the hydrogen sensor configured to measure a hydrogen concentration at a process outflow of the cleaning vessel.

In some cases, the core assembly occupies over 50% of a diameter of the cleaning vessel. In some cases, the core assembly may occupy over 20%, or 30%, or 40% or more of the volume of the cleaning vessel.

According to some embodiments, a method of storing irradiated core components includes the steps of moving an irradiated core component to a pool immersion chamber; removing, by blowing the irradiated core component with an inert gas, primary coolant from an exterior of the irradiated core component; applying moist inert gas to the irradiated core component; flooding the irradiated core component with water; and immersing the irradiated core component in a pool of water.

In some examples the step of applying moist inert gas is accomplished by gradually increasing the moisture content in the inert gas.

In some cases, the step of applying moist inert gas comprises gradually increasing the moisture content in the inert gas to 100%. The primary coolant may be sodium in some examples. The sodium may be present on the irradiated core component, and the sodium may be reacted with water.

The method may include the further step of loading the irradiated core component into a cask while immersed in the pool of water. In some cases, the method is carried out in a time period of less than about 2 hours.

In some examples, the method includes the step of flushing the irradiated core component with water while immersed in the pool of water.

According to some embodiments, a method of handling spent nuclear fuel includes removing a spent fuel assembly from an in-vessel storage system within the nuclear reactor vessel; transferring the spent fuel assembly to a pool immersion cell; reacting residual sodium on the spent fuel assembly with water; and immersing the spent fuel assembly in a pool of water.

The method may further include the step of storing the spent fuel assembly in the pool of water for long-term decay. In some cases, the method includes loading a cask with the spent fuel assembly.

In some examples, the step of loading the cask is performed within the pool of water. Optionally, the step of reacting the residual sodium is performed by passing a gas with a positive moisture content over the spent fuel assembly. In some cases, the gas is an inert gas, and may be argon.

The method may include the step of increasing the moisture content in the gas, such as up to about 100%. The increasing the moisture content may be done gradually and may stop at any suitable moisture content.

In some cases, the method includes the step of creating a passivation layer over residual sodium. The passivation layer may be created by reacting the sodium with a reactant (e.g., water) for a length of time. The passivation layer may be created by applying water to the residual sodium to create a layer of sodium hydroxide.

The method may further include the step of blowing a gas through the spent fuel assembly and measuring the flow rate of the gas through the spent fuel assembly. In some cases, the gas may be measured for inclusion of reaction products, fission products, the presence of primary coolant, or some other characteristic.

DETAILED DESCRIPTION

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

Previous sodium removal efforts used a water vapor-inert gas followed by a water flush. The sodium wetted component was placed into a pressure vessel mating the assembly inlet to semi-gas tight receptacle. The pressure vessel was closed and inert gas flow was established. Moist steam was introduced into the gas flow inlet in a controlled fashion. Hydrogen levels in the gas stream leaving the vessel were monitored and the control input for raising the moisture level in the inert gas stream. As the sodium was reacted, the moisture level was increased until there was no hydrogen with 100% moisture levels in the gas. This process was typically carried out in a dedicated hot cell, which was designed to handle the pressure of the hydrogen build up. Furthermore, it required dedicated fuel handling equipment.

At that point, the vessel was slowly flooded and water flow was initiated using a traditional pump. The ion level in the water was monitored and swapped as necessary until water flowing through the assembly would have low levels of sodium ions. The vessel was then drained and the process system and assembly was dried. The cleaned assembly was removed from the vessel. The process time was approximately 18 to 24 hours for each assembly.

This process removed almost all sodium and sodium reaction products. Stainless steels were typically used in fuel assemblies, and it was typically deemed beneficial to achieve high cleanliness standards regarding sodium hydroxide residue, especially in areas of stress.

In addition, in some cases, the irradiated assemblies were sent directly to a dry storage, post irradiation examination, or reprocessing. According to many regulatory standards, the spent fuel disposal acceptance standards mandate very low levels of reactive metals.

According to some embodiments, the following describes an expedited method to get sodium wetted components into a traditional water filled spent fuel storage basin thereby greatly increasing efficiency, reducing the equipment and buildings required for handling irradiated assemblies, and reducing potential radiation exposure to facility workers and the public.

Refueling System Layout in the Reactor Building and Fuel Storage Facility

Figure 1:
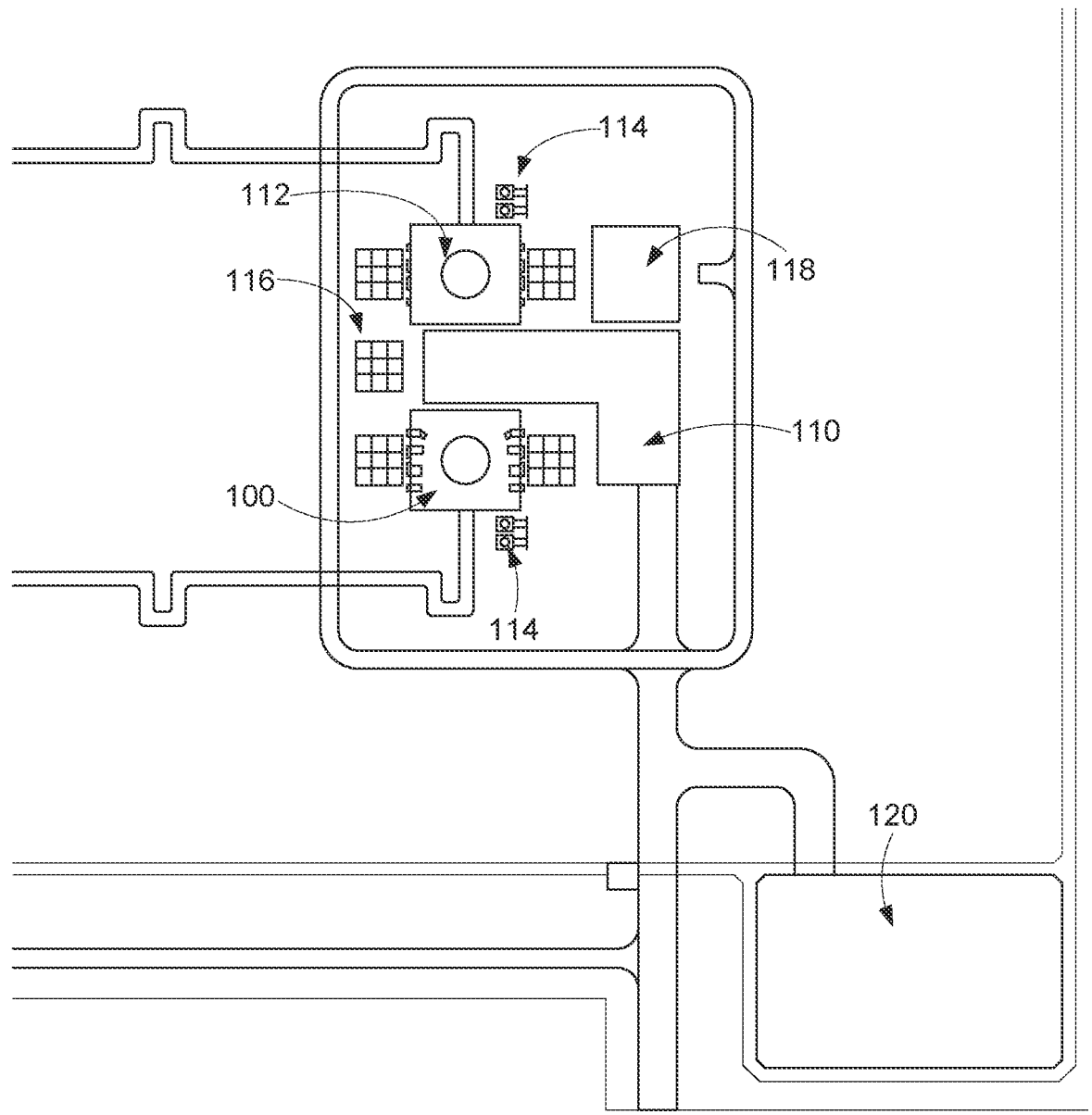
FIG. 1 is a schematic representation of a nuclear facility showing reactor buildings, and fuel handling and storage facility, according to some embodiments.
Figure 2:
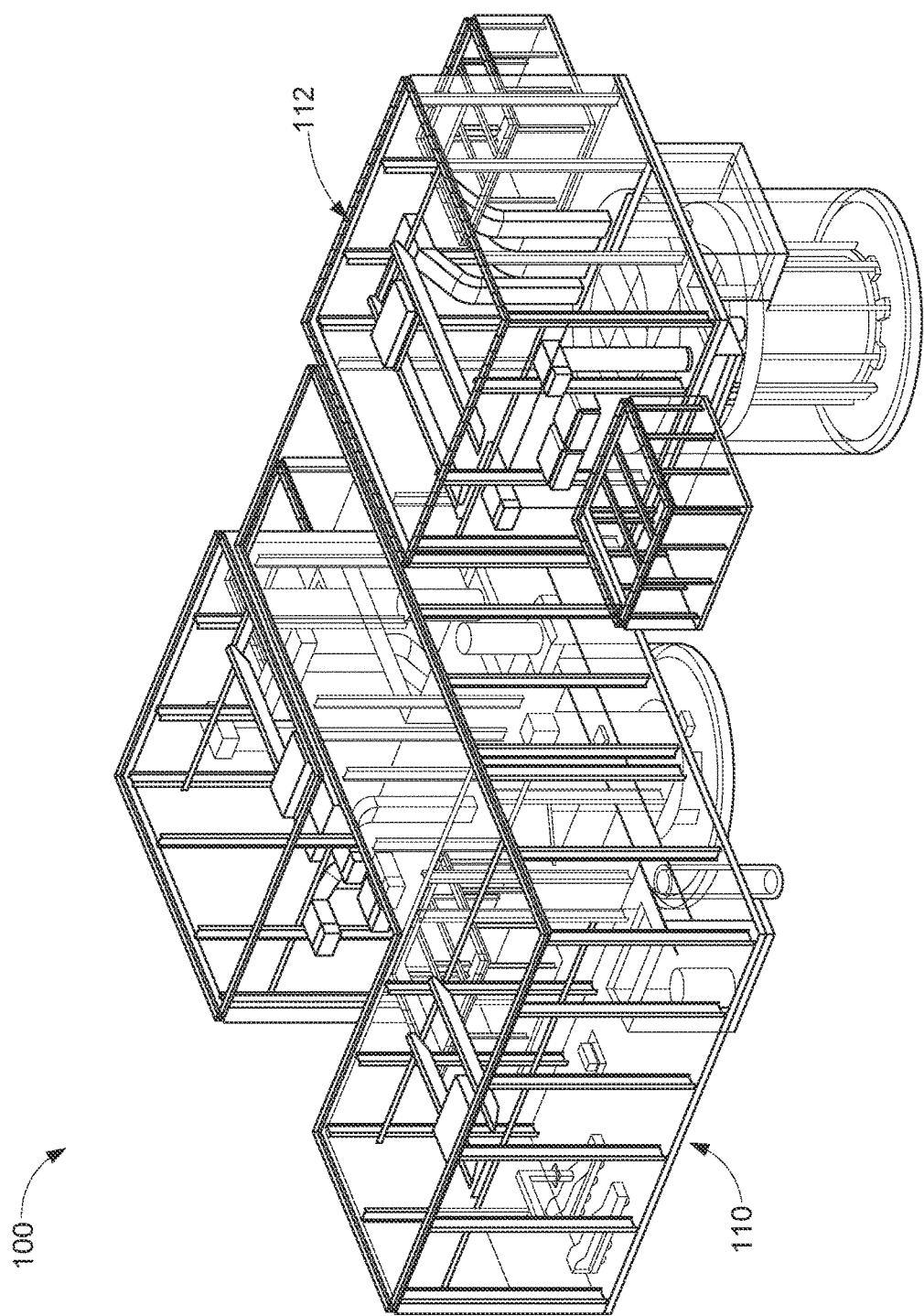
FIG. 2 is a perspective view of a schematic representation of a nuclear facility, in accordance with some embodiments.
Figure 3:
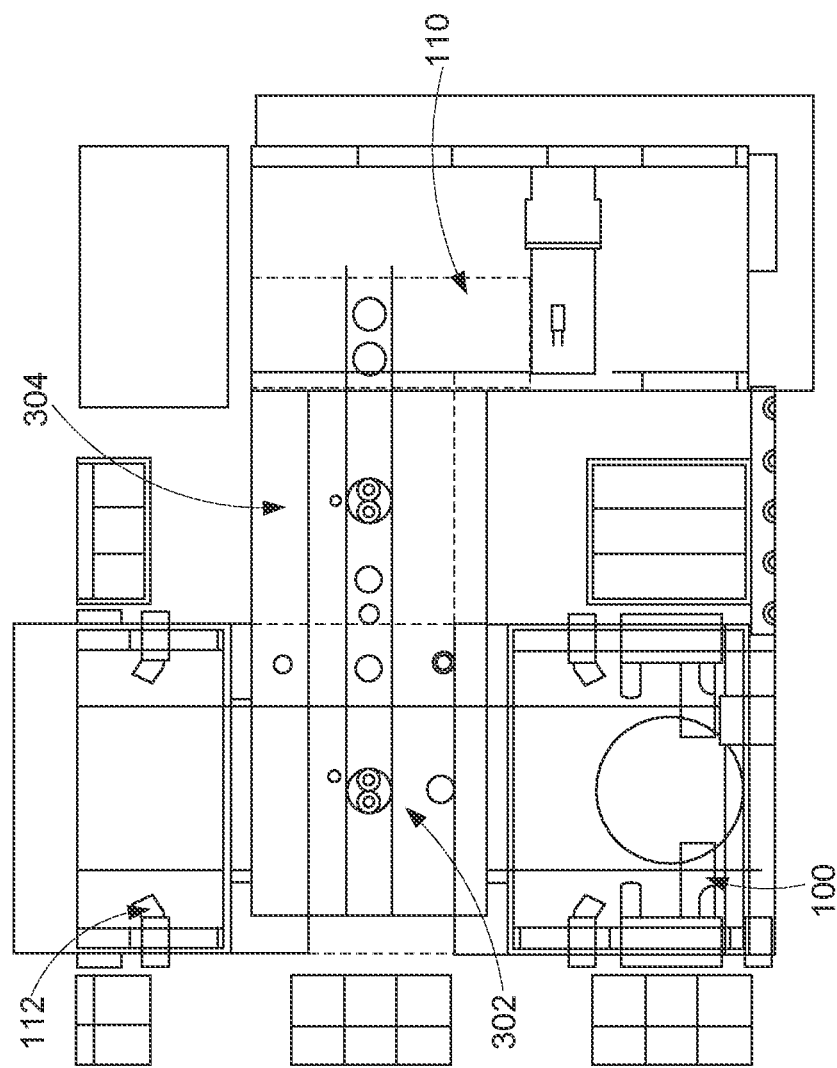
FIG. 3 is a schematic representation of a nuclear facility with multiple reactor buildings, a fuel handling and storage facility, in accordance with some embodiments.
Figure 4:
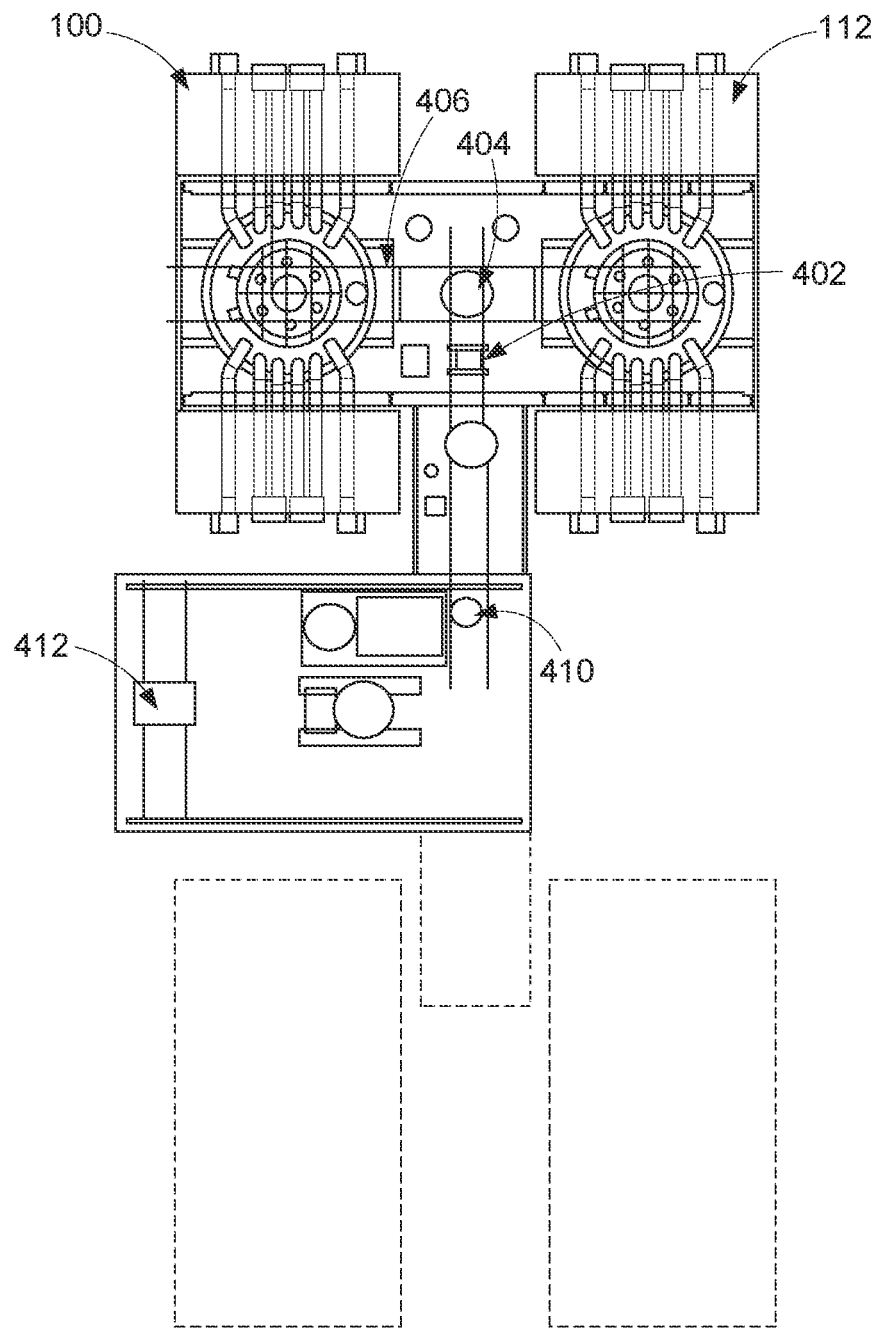
FIG. 4 is a schematic representation of a nuclear facility showing two reactor buildings and a shared refueling floor, in accordance with some embodiments.

With reference to FIGS. 1, 2, 3, and 4 according to some embodiments, a general layout of a reactor building(s) 100 and Fuel Storage Facility (FSF) 110 are illustrated. In some embodiments, the plot plan has the flexibility to support up to 4 reactor units or more in a quad arrangement; however, for efficiency, only two units are illustrated, a first reactor building 100 and a second reactor building 112. In some cases, the buildings may be arranged as shown in FIG. 3 or FIG. 4 to allow shared refueling equipment and a larger crane envelope for reactor building (RB) maintenance and large component cask transfers that may occur in the maintenance and refueling space 302. This would allow the RB crane to set a large cask on bottom loading transfer cask rails for transfer to the FSF/Maintenance Facility 110. In some cases, a transfer hall 304 and FSF/Maintenance Building 110 may be separate structures with only the fuel service and maintenance facility having another overhead crane, while in some embodiments the transfer hall is part of the FSF/Maintenance Facility 110. According to some example embodiments, the estimated refueling and maintenance footprints are described in Table 1 below.

TABLE 1

Estimates of Refueling and Maintenance Footprint

| Area Description | 3D Model | Trade Study 2 Concept | Suggested Change from 3D model |
|---|---|---|---|
| Refueling area between reactor buildings or reactor | 26 × 19 = 494 m² | 15 × 26 = 390 m² | Reactor halls are merged with smaller common area between for refueling and maintenance. Its most important feature is the EVST |
| Refueling area from back of reactor units to FSF L-shape | 16 × 19 = 304 m² | 15 × 16 = 240 m² | Except for fuel inspection and conditioning cell. This area serves only as a transfer hall for BLTC or large casks between common reactor refueling floor and FSF and Maintenance Building |
| Main FSF and Maintenance Building Hall (Back of L portion with pool or CLS) | 40.2 × 19.4 = 780 m² | 25 × 50 = 1250 m² | Larger area specified for maintenance |
| Refueling Portion of FSF | 10 × 25 = 250 m² | 10 × 25 = 250 m² | |
| Total Refueling Footprint | 1048 m² (sum of first two and fourth row) | 880 m² (sum of first two and fourth row) | |
| Total Refueling and Maintenance Footprint | 1578 m² (sum of first three above) | 1880 m² (sum of first three above) | |

Of course, other layouts, dimensions, configurations, number of buildings, are entirely possible within the scope of the present disclosure. Any physical sizes including dimensions, elevations, sizes, weights, etc. are provided purely for example and are not limiting on the contents of the disclosure, unless specifically recited in the appended claims.

In some cases, a residual heat removal (RHR) system 114 is provided to assist with decay heat removal and one RHR system 114 may be associated with each reactor building 100, 112. One or more control building modules 116 may be provided to monitor and/or operate the reactors within the reactor buildings. In some cases, auxiliary buildings may be provided, such as warehouse 118 space, and a remote fuel storage area 120.

In some cases, as shown in FIG. 4, a refueling system may include a central control facility monitoring high level operations of a conditioning cell, bottom loading transfer cask (BLTC) 402, Ex-Vessel Storage Tank (EVST) 404, Ex-vessel handling machine (EVHM) 406, transfer adapter, transfer station lift, In-vessel Transfer Machine (IVTM), rotating plug, pool immersion cell 410, pool cooling and cleanup system, pool core assembly handling machine 412 and other components and systems. Local refueling control points may have a plant-based data and communication network that transfers information to the central refueling control room.

In some instances, new core assemblies arrive from suppliers and are uprighted in their shipping containers in the FSF 110. A jib hoist and grapple tool may be used to transfer the vertical core assemblies to an inspection stand and on to a conditioning cell. Prior to an outage, the BLTC may be used to pick up conditioned core assemblies from the conditioning cell and transfer them to the EVST in the reactor building. In some embodiments, the EVST may be a sodium EVST, an argon EVST, or may comprise another substance, which may be inert. In some cases, during an outage, the EVHM may transfer the core assemblies between the EVST and the reactor transfer adapter. The EVHM hoist may be used to transfer core assemblies through the transfer adapter to the cover gas region where core assemblies are passed to a transfer station lift below the reactor's refueling port. The transfer station lift may move core assemblies vertically between the cover gas region and the IVTM refueling region above the top of core. In some examples, the IVTM in combination with rotating plug movements moves the core assemblies between the transfer station lift, core positions, and In-Vessel Storage (IVS) positions for decay.

According to example methods, spent fuel assemblies can be removed from IVS positions in the reactor by the IVTM and may be transferred to the transfer station lift. The transfer station lift may be used to raise fuel or non-fuel core assemblies to the cover gas region where the EVHM hoist and grapple engage the assemblies. The EVHM may then raise the core assemblies out of the reactor through the transfer adapter and into the EVHM cask on the refueling floor. Once the EVHM cask is secured, the core assemblies can be transferred to the EVST where they remain during the refueling batch transfers.

The method may include further steps, for example, following the outage, the BLTC may pick up the spent core assemblies and transfer them to the FSF to be packaged as waste or processed to spent fuel storage. In the wet cask loading method, the BLTC may transfer some, or all, of the core assemblies to a pool immersion cell where sodium is reacted, the assemblies may be immersed in water, and then may be transferred to the larger spent fuel pool. A pool handling machine may be used to move the fuel assemblies to storage racks for long term decay (e.g., 10-15 years). Some or all of the core assemblies may be eventually processed into casks within the pool such as a typical light water reactor cask loading process, as in known to those of ordinary skill in the art. The dried out, inerted, spent fuel casks may be taken to a site storage pad and waste (non-fuel) casks may be sent to long term, waste disposal sites.

Detailed Refueling Process Descriptions According to Some Embodiments

Arrival of New Core Assemblies (Fuel, Control Rod, Shield and Reflector Assemblies)

Figure 5:
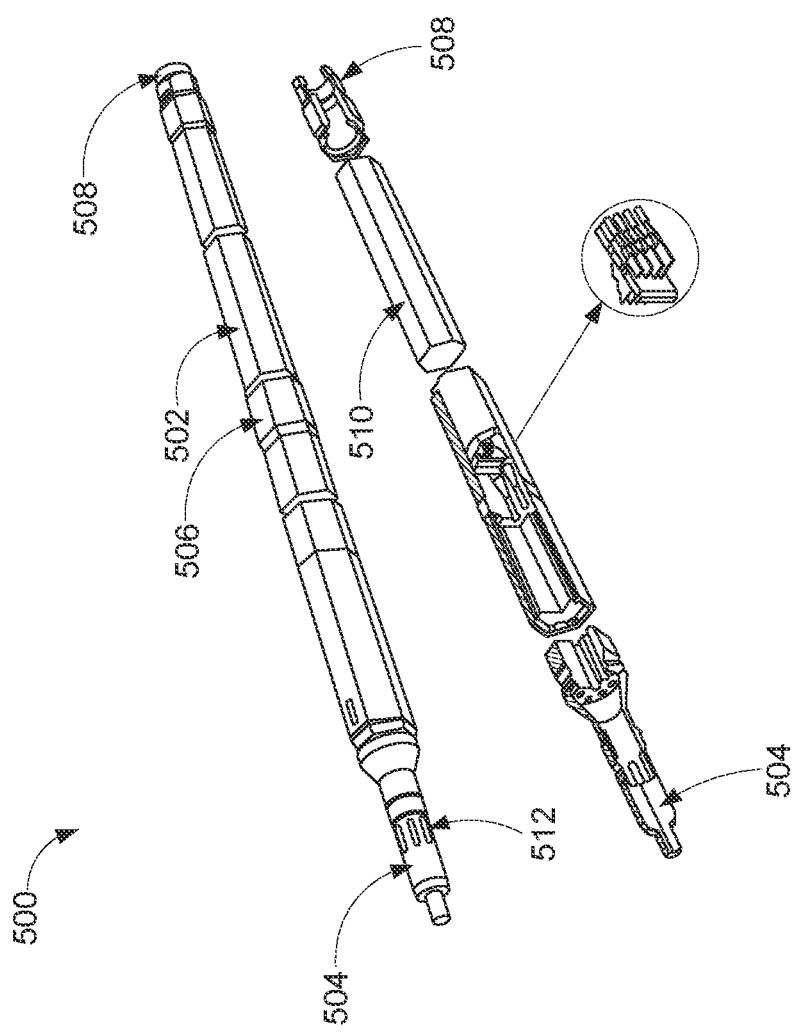
FIG. 5 is a perspective illustration of a nuclear fuel assembly, in accordance with some embodiments.

With reference to FIG. 5, which illustrates a representative example of a core assembly 500, new core assemblies may consist of driver fuel, control rods, shield, and reflector core assemblies. In some cases, the core assemblies 500 include a duct 502 that defines a nozzle assembly 504 at a first end, an above core load pad 506, and a handling socket 508 at a second end. In some cases, the core assemblies 500 may have a consistent hexagonal external configuration. Inside the core assembly 500, a fuel pin bundle assembly 510 is secured within the duct 502 and may include any suitable number of fuel pins. A series of coolant inlet ports 512 allow coolant to enter the core assembly 500 and absorb heat from the fuel pin bundle assembly 510 is the coolant flows through the duct 502.

In some cases, the core assemblies 500 arrive at the reactor site in shipping containers and each container may contain four core assemblies. The FSF overhead crane or forklift may unload the shipping containers from supplier trucks. The shipping containers may be stored in a secure area of the FSF until their inspection and conditioning is required for the outage. The shipping containers may be used for protection and security of the assemblies prior to the outage since they have the appropriate component support, vibration monitors, FME protection, and environmental controls.

During initial reactor construction an additional full core load of dummy core assemblies (e.g., core assemblies with no fuel therein) may be used to prove reactor and system critical characteristics. Depending on their design, these dummy assemblies may also be used to maintain core configuration during later refueling or maintenance activities. The dummy assemblies only require normal radioactive waste disposal controls since they have no fuel content. Specialized core assemblies with startup neutron sources may also be provided for initial reactor startup. These startup sources may be handled as fuel for their eventual disposal due to their radioactive source content. Both of these core assembly types may follow the normal core assembly handling process used for reactor refueling and disposal.

In some cases, an outage batch is sized for an 18-month cycle and is estimated to have 30 fuel assemblies and 10-15 control rods. In preparation for a refueling outage, an uprighting mechanism may bring the shipping containers to a vertical position so that core assemblies stored therein can be grappled by a top entry grapple tool. The container may be opened under strict cleanliness controls, such as to avoid contamination.

Figure 6:
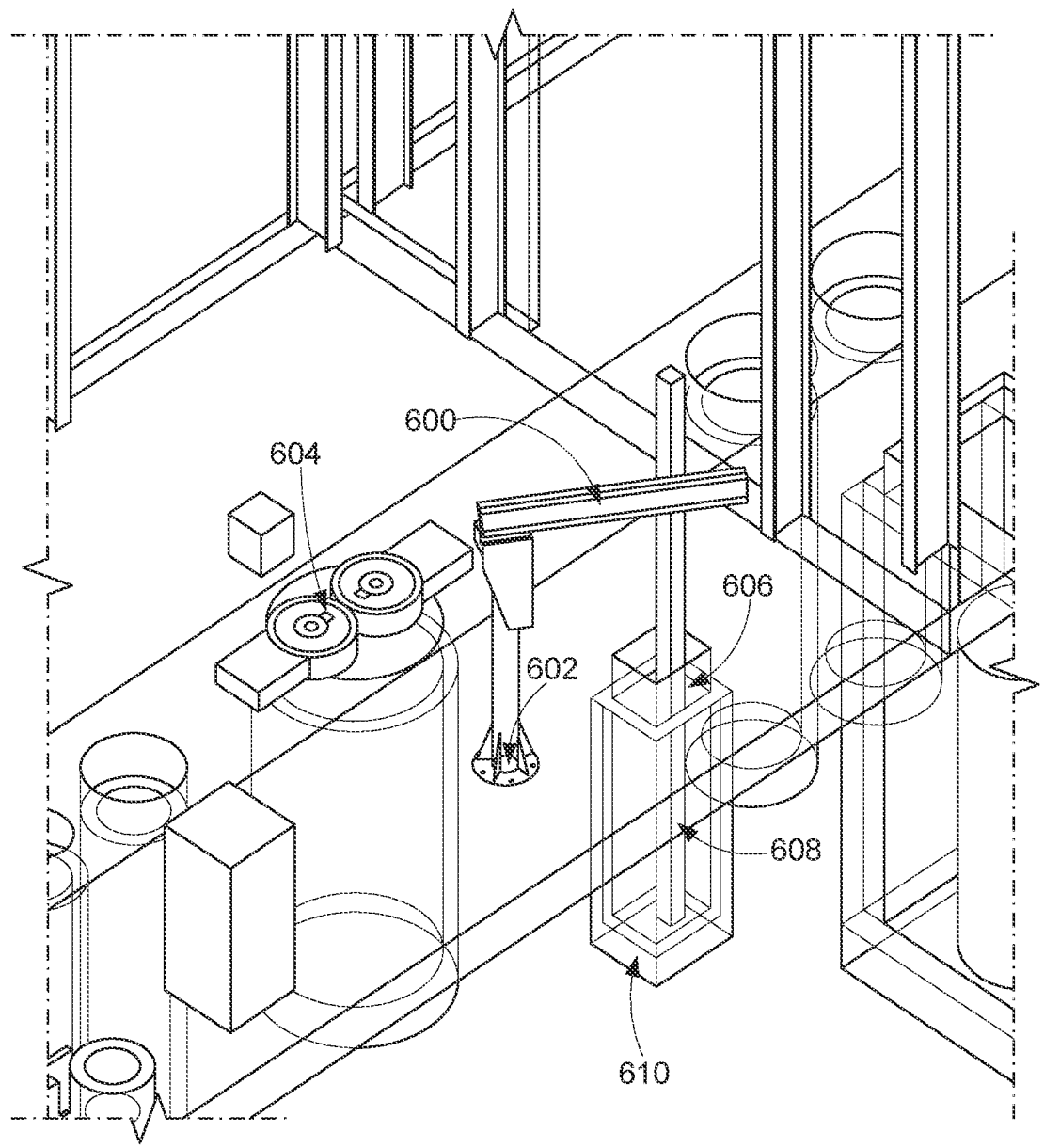
FIG. 6 is a perspective schematic illustration of a core assembly inspection stand, conditioning cell, and jib hoist, in accordance with some embodiments.

With reference to FIG. 6, a jib hoist 600 is mounted to a jib hoist mount 602 and may carry a top entry grapple tool that may be configured to engage each core assembly in the shipping container and transfer them to an inspection stand. In some examples, the grapple tool may have about 3-4 grapple fingers that engage the handling socket 508 of the core assembly for a secure lift. FIG. 6 further illustrates a potential layout of the jib hoist 600, conditioning cell 604 and inspection stand 606. Emptied core assembly shipping containers may be returned to suppliers for future batch reloads and are not typically part of plant equipment.

In some cases, the inspection stand 606 is seismically qualified and may include a vertical elevator handling 608, two (or more) core assemblies and may be recessed into a pit 610 on the transfer hall floor near the conditioning cell 604. Once assemblies are loaded into the stand 606, the elevator 608 may raise the assemblies past operators for a full length inspection process. The assemblies may have identities recorded, may be scanned for potential shipping damage, and may be verified clean and free of foreign material. The core assembly identification may be translated to the plant's refueling database for core assembly tracking. The tracking can be maintained throughout the core assembly's service life and during disposal operations by the plant's radioactive inventory surveillance program. Flow tests may also be performed on the core assemblies in the inspection stand as a final assembly go/no-go test.

New Core Assembly Storage and Conditioning (Prior to Refueling Outage)

A clean, uncontaminated, conditioning cell may be prepared for core assemblies, such as by opening a floor valve and pulling or removing a floor access plug with the jib hoist 600 and grapple tool. The hoist 600 transfers the floor plug to a storage location during loading. Inspected and recorded core assemblies 500 may then be transferred into the conditioning cell 604 with the jib hoist 600 and grapple tool. Each core assembly 500 position in the conditioning cell may be filled by rotating a carousel to align with the floor valve opening. The valve can be closed when the carousel is filled and assemblies 500 are conditioned to refueling temperature in an inert argon environment. In some cases, the carousel capacity may be designed to hold ⅓ of a core batch (e.g., 15 assemblies in some embodiments) to allow batch conditioning with intermediate BLTC transfers to the EVST. The conditioning cell may not be intended to handle core assemblies with decay heat coming from the reactor.

According to some embodiments, the conditioning starts with a feed and bleed process that brings the initial air and moisture content of the conditioning cell to a dry and fully inert argon environment. Electric heating and circulation may then raise the argon environment to the reactor's refueling temperature of about 400 F in stepped increments. In some cases, other forms of heating may be utilized, for example, the argon gas may be passed through a heat exchanger and heat generated in the reactor core may be used to heat the argon gas. The inspection, loading, and conditioning process may be repeated until an outage batch (e.g., up to 45 core assemblies or more) have been conditioned. This process may be done in advance of the refueling outage to ensure core assemblies are fully conditioned and stored in the EVST prior to reactor shutdown. Multiple reactors using the same conditioning cell and EVST may have staggered conditioning times and outages to allow the conditioning cell and EVST to service multiple reactors.

The overhead crane may be used to install floor isolation valves and their associated adapters on the EVST. The shield plug handling cask may be mated to the floor isolation valve to pull and remove the shield plugs to provide access to the carousel for loading. The floor isolation valve may be closed and the shield plugs can be removed and stored by the crane and shield plug handling cask. The EVST may be brought to inerted refueling conditions for receipt of new core assemblies.

Example: BLTC Transfers to the EVST (Prior to Refueling Outage)

The BLTC, at refueling conditions, may mate with the conditioning cell floor valve and up to three or more core assemblies 500 may be sequentially grappled from the carousel and transferred into the cask. The BLTC continues core assembly transfers from the conditioning cell to the EVST carousel until the full refueling batch is staged for the outage. As each core assembly is placed in the EVST the tracking database is updated so all information necessary to establish the planned refueling outage sequence is verified and uploaded to refueling controls. During the outage, the EVHM may exchange new core assemblies in the EVST with spent core assemblies coming from the reactor by the established refueling sequence from the refueling control center.

In some cases, the BLTC is a rail mounted, self-supported, seismically qualified cask with a vertically translating isolation valve. The BLTC may heating and/or cooling capability to handle either new or spent fuel core assemblies. The BLTC may have centerline travel path that accesses the conditioning cell, EVST, and/or pool immersion cell through floor isolation valves.

Example: Reactor Shutdown and Outage Preparation Methodology

According to some embodiments, the reactor is prepared for refueling following a shutdown. Forced flow pumps may be secured in the reactor and natural circulation cooling brings the reactor to a refueling temperature of about 400 F according to some embodiments. The refueling temperature is provided as an example and, of course, other fueling temperatures may be applicable for other reactor types. As used herein, the terms "about" and "approximately" may, in some examples, indicate a variability of up to ±5% of an associated numerical value, e.g., a variability of up to ±2%, or up to ±1%.

The ASME boundary flange may be removed from the refueling port and the RB overhead crane main hook may move the refueling port transfer adapter from its storage location on the refueling floor to the refueling port. The transfer adapter may be installed on the refueling port followed by the associated floor isolation valve on the refueling floor. The transfer column assembly may optionally be tested, inerted, and/or heated to refueling temperature. The transfer adapter may also have cooling capability in the event that a fuel assembly becomes stuck between the cask and reactor. In some cases, the transfer adapter loading is supported by the reactor building refueling floor civil structure and not the reactor head. In some cases, the transfer adapter is shared between multiple reactors (e.g., two, three, four or more reactors) with a storage position supporting offset outage schedules.

At the EVST, shield plug transfer cask may be mated to the EVST floor isolation valve by the RB crane. The cask and floor isolation valves may be opened to access the EVST shield plug. The plug may be grappled by the cask hoist and lifted into the cask. After raising the plug, the valves may both be closed and the EVST shield plug may be taken to a storage location in the EVST carousel or to another floor structure. The floor isolation valve may now be an inert EVST boundary for refueling port plug transfer.

At the reactor, the inerted shield plug transfer cask may be mated to the transfer adapter and/or floor valve with the RB crane. The cask isolation valve and the floor isolation valve may be opened to access the reactor's refueling port plug. The plug may be grappled by the cask hoist and lifted into the cask. The valves may both be closed and the refueling port plug may be taken to the EVST plug storage positions or other location for portable glove box maintenance. The shield plug cask may also have a storage location on the RB refueling floor and, in some cases, has seismic support.

The control rod drivelines may be uncoupled from the control rod assemblies (CRAs) in the core to allow rotation of the rotating plug and IVTM for refueling. In some cases, the control rod core assemblies are disconnected with tools actuated through the control rod drive mechanism above the reactor head. Alternatively, a new CRDM design will allow remote disconnect and raising of drive lines to allow the rotating plug and IVTM motion.

The rotating plug jacks may lift the plug off of its reactor head ledge seal to allow its rotation. Power and control cables for the rotating plug and IVTM may be reconnected and the IVTM drivelines may be unlocked. The IVTM may be calibrated by position checks on up to six or more gauging locations around the perimeter of the core.

The transfer station lift, directly below the refueling port, may be cycled to confirm it raises and lowers the core assembly transfer basket from a level slightly above the reactor's sodium level down to a core assembly length above the core. The lift may be driven by a rotating shaft coming through the reactor head or refueling port with cover gas seals. In some cases, the lift translates core assemblies to an elevation where the IVTM can grapple the assemblies from the lift's side entry basket.

In some embodiments, once core assembly IVS position is verified empty, the process starts one a one refueling exchange process. The verified refueling sequence for core assembly movements may be confirmed to be in the integrated refueling control system for the EVHM, rotating plug, IVTM and EVST carousels.

Figure 7:
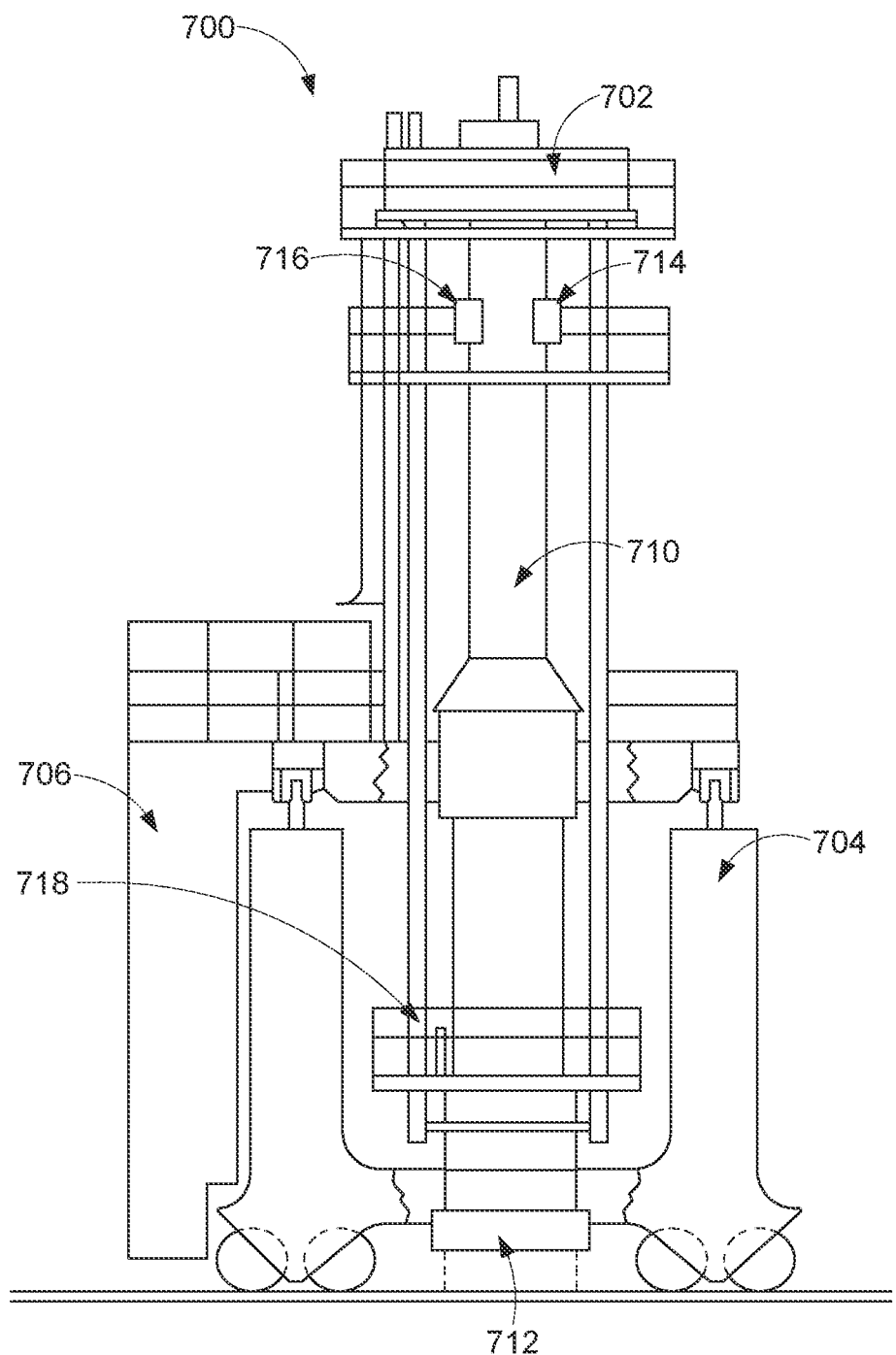
FIG. 7 is a schematic representation of a rail-mounted EVHM, in accordance with some embodiments.

Core Assembly Transfers Between EVHM, Transfer Station Lift, IVTM, Reactor Core and IVS With reference to FIG. 7, according to some embodiments, the EVHM 700 is a rail mounted, seismically qualified cask support structure for handling all core assembly transfers during an outage. The EVHM may be designed with the cask centerline travel aligned with both reactor refueling ports and the EVST access ports. In some cases, the EVHM 700 has a grapple drive system 702, a transporter 704, and a control cab 706. The control cab 706 may include controls for operating the transporter 704 and the grapple drive system 702.

The EVHM may further have a cask 710, which in some cases, is shielded. The cask may have a moveable bottom entry isolation valve 712 and may further have inerting, heating, and cooling capability for new and spent core assemblies. The EVHM 700 may further have a blower 714 and/or an air exhaust 716 for circulating air or some other gas. The EVHM cask grapple may be a universal top-entry design and may have 3-4 fingers (or more) that engage structure on the core assembly heads. The EVHM cask may have a refueling controls interface for interlocks between EVHM cask, the transfer adapter floor valve, the transfer station lift, and the EVST carousel.

In use, such as during an outage, the EVHM 700 can mate with the EVST floor valve and individually grapple and raise up to three or more core assemblies into its cask 710, which may be inerted, shielded, and/or heated. The EVST carousel may be rotated as required to select the sequenced core assembly positions for refueling. The EVST is isolated by closing the EVHM cask isolation valve and EVST floor valve. The EVHM 700 may additionally have an indexing system 718 to accept multiple core assemblies.

The EVHM 700 may move to the refueling port transfer adapter and mate with its floor valve. The transfer path into the reactor may be verified as inerted and heated to refueling conditions prior to any valve operations.

The grappled core assembly within the EVHM 700 may have its identity confirmed to match the refueling sequence. If inert refueling conditions are equal across the transfer adapter floor valve and cask isolation valve, both valves may be opened for the transfer path into the reactor. The EVHM 700 hoist may lower the core assembly from the cask down to the lift station basket in the cover gas region.

The lift station may be located in the sodium below the refueling port and may lower core assemblies through the refueling port thimble to a core assembly length above the core. The transfer station lift may have refueling control interlocks with the EVHM hoist/grapple and the IVTM. The lift station basket may have a side entry design to limit the IVTM's required vertical motion. The lift station assembly may be vertically removable through the reactor's refueling port for any necessary maintenance or replacement.

The IVTM may perform the core and IVS transfers to complete the refueling outage sequence (e.g., moves from core to IVS, IVS to transfer station lift, and transfer station lift to core). In some cases, the design of the transfer station allows the IVTM grapple head to move horizontally into the slotted thimble over the core assembly in the transfer station basket. In some cases, the IVTM grapple aligns with the core assembly's center then lowers and grapples the internal diameter. The IVTM grapple may raise vertically to unseat the core assembly head from the basket. It may then translate the grappled core assembly horizontally out of the side entry basket. This process may be repeated by the IVTM to retrieve and deposit core assemblies in the lift station basket.

The IVTM may perform the core and IVS transfers to complete the refueling outage sequence (e.g., moves from core to IVS, IVS to transfer station lift, and transfer station lift to core). The IVTM may be installed on the reactor's rotating plug and may have a horizontally traveling pantograph carrying a grapple head with telescoping features to raise and lower core assemblies. The IVTM grapple may be centered on a core, IVS, or transfer station position by rotation of the rotating plug, rotation of the IVTM, and/or extension of the pantograph. In some cases, the IVTM grapple is a top-entry design with 3-4 fingers that engage the inner diameter of the core assembly head, but can be configured with any suitable design. The IVTM grapple head also may have a rotation capability to orient the core assembly's hexagonal outline for core insertion. The reactor's UIS may have a slot that allows the IVTM to refuel the core's centerline region. The mapped core assembly locations in the reactor may be stored in the machine's computer control memory which allows refueling by an automated sequence which may be confirmed by operators. The IVTM may have refueling control interlocks with the control rod drives, the rotating plug, and/or the transfer station lift. The in-vessel portion of the IVTM may be replaceable by pulling the assembly through a transfer adapter and into a cask on the refueling floor.

According to some embodiments, to start the refueling sequence, the IVTM moves a spent core assembly from the core to an open IVS position then picks up a new core assembly from the transfer station basket and puts it into the open, sequenced, core position. The lift station may be operated to raise the head of the core assembly to a grappling height in the cover gas region. The EVHM cask isolation valve and transfer adapter floor valve may be opened, and the cask hoist may lower and grapple the core assembly from the transfer station lift basket. The core assemblies coming from IVS storage may have a decay heat less than 1.2 kw (e.g., two 18-month cycles) to be transferred in the EVHM.

The cask hoist may raise the spent core assembly into the shielded portion of the cask above the isolation valve and a sodium drip pan may rotate under the assembly to catch dripping sodium. In some cases, cask passive or active cooling features may be established to remove core assembly decay heat. The core assembly identification may be verified and/or recorded, such as by cask cameras viewing the top of the core assembly. The cask hoist may release the spent core assembly into a cask holding position for transfer to the EVST. The process may be repeated according to the refueling sequence for other core assemblies until the EVHM is filled with one or more spent fuel assemblies.

The EVHM cask isolation valve and transfer adapter isolation valve may be closed and the EVHM may be moved from the refueling port to the EVST for unloading into the carousel of the EVST. The refueling process is repeated according to the refueling sequence for all core assemblies in an outage batch, which in some cases may be 45 assemblies, but of course other embodiments may utilize any suitable number of core assemblies. In some cases, fewer than all of the core assemblies are replaced at a given time. The IVTM can perform independent in-vessel fuel, reflector, or shield shuffles or rotations in the outage sequence in parallel with EVHM movements to offload and reload core assemblies at the EVST.

EVHM Core Assembly Transfers to EVST

After the EVHM is loaded with spent core assemblies it may decouple from the refueling port floor valve and move to the EVST. The EVHM cask isolation valve may mate with the EVST floor valve and the valves may be opened. Each of the spent core assemblies in the EVHM cask may be grappled and set down in sequenced storage position of the EVST carousel. The fuel assemblies may be placed in the outer rows of the carousel for maximum decay heat removal and any non-fuel assemblies may be placed in an inner ring of the carousel. Each core assembly's storage position may be recorded and tracked by the integrated refueling system controls. The EVHM cask grapple, hoist, and isolation valve may have refueling interlocks with the EVST floor valve and carousel drive.

The EVST may be used as a short-term storage point during the refueling outage. After the outage, the BLTC may transfer core assemblies to their spent fuel processing and waste disposal cycles.

Example: BLTC Core Assembly Transfers to FSF

Following a reactor outage, the BLTC may move over the EVST and mate with the floor valve. The carousel may be rotated to the appropriate core assembly, and cask and floor isolation valves may be opened. The cask hoist and grapple may be lowered into the EVST and the core assembly may be grappled and raised into the cask. The cask may be secured by closing its isolation valve and the floor valve. The cask isolation valve may then be raised to separate the BLTC for movement on its rails. In some cases, the BLTC may have a transfer capacity equal to the EVHM, which in some cases, is up to 3 core assemblies at a time. The BLTC may be a seismically qualified rail mounted cask operating in both the reactor building and/or the FSF. The BLTC may serve multiple reactors and may support one, two, three, four, or more reactors in an expanded plot plan.

Example: External Sodium Removal

Figure 8A:
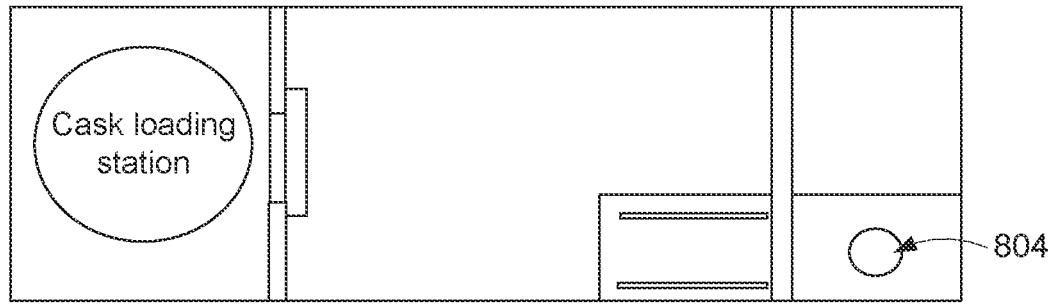
FIGS. 8A and 8B are schematic representations of a pool immersion cell from a plan view and an elevation view, respectively, in accordance with some embodiments.
Figure 8B:
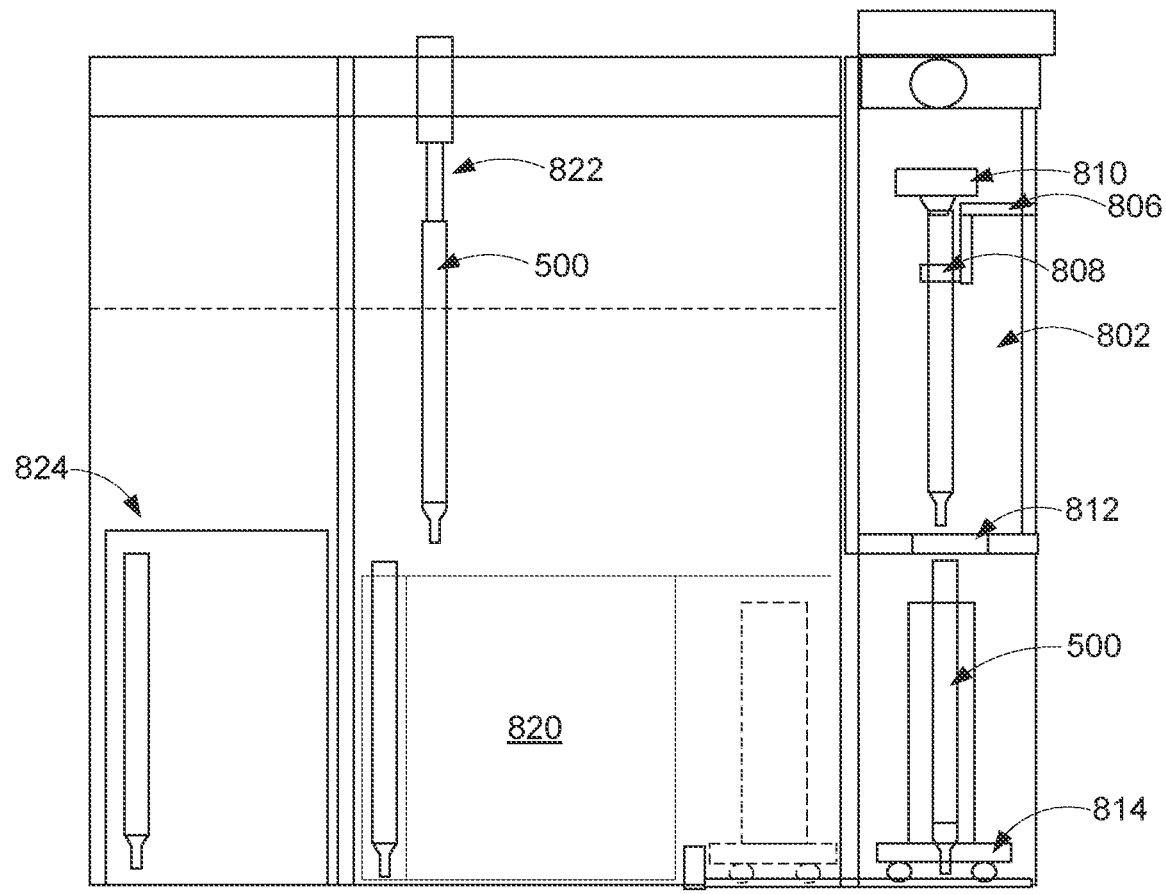

Contrary to prior wet cask loading methods that take a long time, such as greater than two hours, or four hours, or six hours, or eight hours, or ten hours, or fifteen hours, or eighteen hours, or twenty hours, an expedited process is described for transferring irradiated core assemblies directly into a water filled spent fuel pool for long term decay and wet cask loading. FIGS. 8A and 8B show an approach for a pool immersion cell, underwater storage racks, and wet cask loading. The described process is very efficient and significantly faster than prior processes. Underwater long-term fuel storage has the advantage of extensive licensing and operational experience in light water reactors with high reliability.

The preparation for direct pool immersion relies on two primary factors. The first is blowing the core assembly down with inert gas either once it is removed from the reactor core, in the pool immersion cell, or both. Second, the assemblies may have a moist inert gas reaction cycle in the pool immersion cell which may be followed by a full core assembly flooding. After the flooding process, the core assembly may be transferred to the main portion of the pool for long term storage. This process significantly reduces the typical 18-24 hour time of prior processes since the assembly is not dried and inerted but instead goes directly to the pool and does not get handled again by the BLTC.

Figure 9:
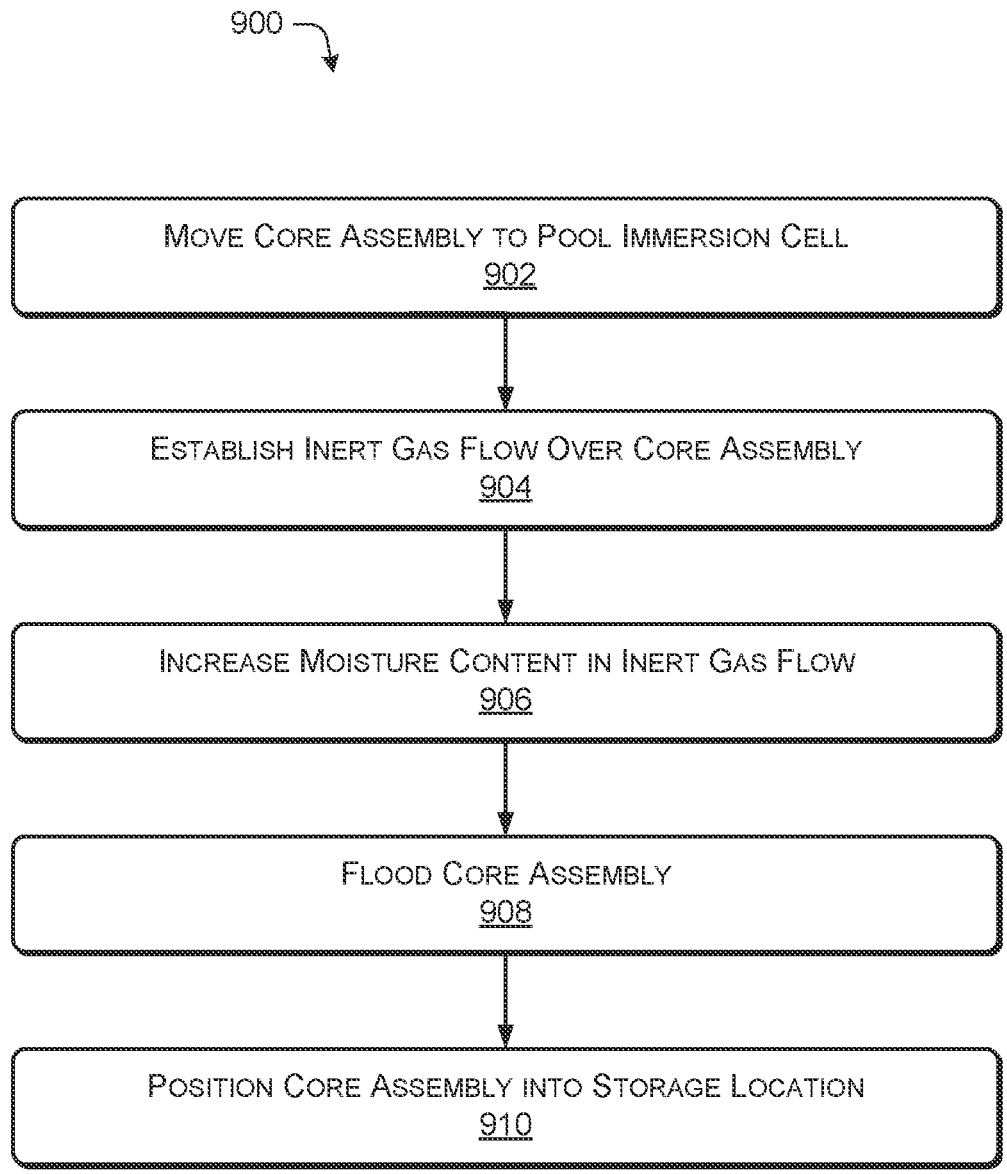
FIG. 9 is a sample process diagram for storing irradiated core assemblies, in accordance with some embodiments.

With reference to FIGS. 8A, 8B, and 9, according to some examples, the detailed pool immersion process steps 900 may include some of the following:

At block 902, the core assemblies may have been handled dry in the inert environments of the EVHM, the carousel, and the BLTC which will limit residual sodium remaining after their removal from the EVST.

The spent core assemblies may be moved, such as by the BLTC, to the initially dry, inerted, pool immersion cell 802.

The BLTC may mate with the immersion cell floor valve 804 and lower the core assembly to a core assembly elevator 806 that captures the core assembly 500, such as just under the upper handling socket with a clamping device 808.

After the load is transferred to the clamping device, the BLTC may release its grapple, raise its hoist, and the cask and floor valves may be closed.

Within the immersion cell 802, a retractable arm and nozzle 810 may move over and mate with the core assembly head and a cell vent path may be established through the immersion cell 802 to the water of the pool.

At block 904, an inert gas flow may be established through and/or over the assembly 500. Optionally, the flow of the inert gas may be measured to ensure free flowing gas through the assembly.

At block 906, moisture content in the inert gas flow stream may be incrementally increased into the gas stream to about 100% causing the residual sodium to react.

After reaching 100% moisture content, the gas and moisture flow may be stopped and the retractable arm and the nozzle assembly 810 may be withdrawn from the core assembly 500.

At block 908, a cell isolation valve 812 may open at the bottom of the cell allowing it to flood and cover the assembly 500.

The elevator 806 may then lower the core assembly 500 into a mobile trolley rack 814 on the bottom of the pool.

The elevator clamping device 808 may release the core assembly that is seated in the mobile trolley rack 814 and raise back into the cell 802.

At block 910, the mobile trolley rack 814 may move the core assembly 500 into the main pool 820 where a simple fuel handling machine 822 may grapple the assembly 500 and transfer it into a designated top-entry storage rack location.

The sodium reaction process may be repeated for the outage batch of fuel and non-fuel core assemblies.

The core assembly may continue its decay in the fuel racks for a suitable length of time (e.g., 10-15 years in some cases), cooled by the pool until it has met decay heat requirements for the wet cask loading process.

As optional steps, the overhead crane may transfer the inner cask container 824 into the cask pit for the wetted pool loading.

The simple fuel handling machine 822 may grapple the decayed core assemblies and transfer them to the submerged cask 824.

The process may be repeated to fill the inner cask 824 which may then be capped and raised to the fuel facility floor with the FSF crane.

The inner cask may be drained, dried, and/or fully inerted, such as with helium.

The FSF crane may assemble the final dry cask shielding package and place it onto the transporter The spent fuel dry casks may be taken to a site storage pad. Waste casks may be filled with non-fuel assemblies by similar or the same method and may be sent to applicable waste disposal sites.

Figure 10:
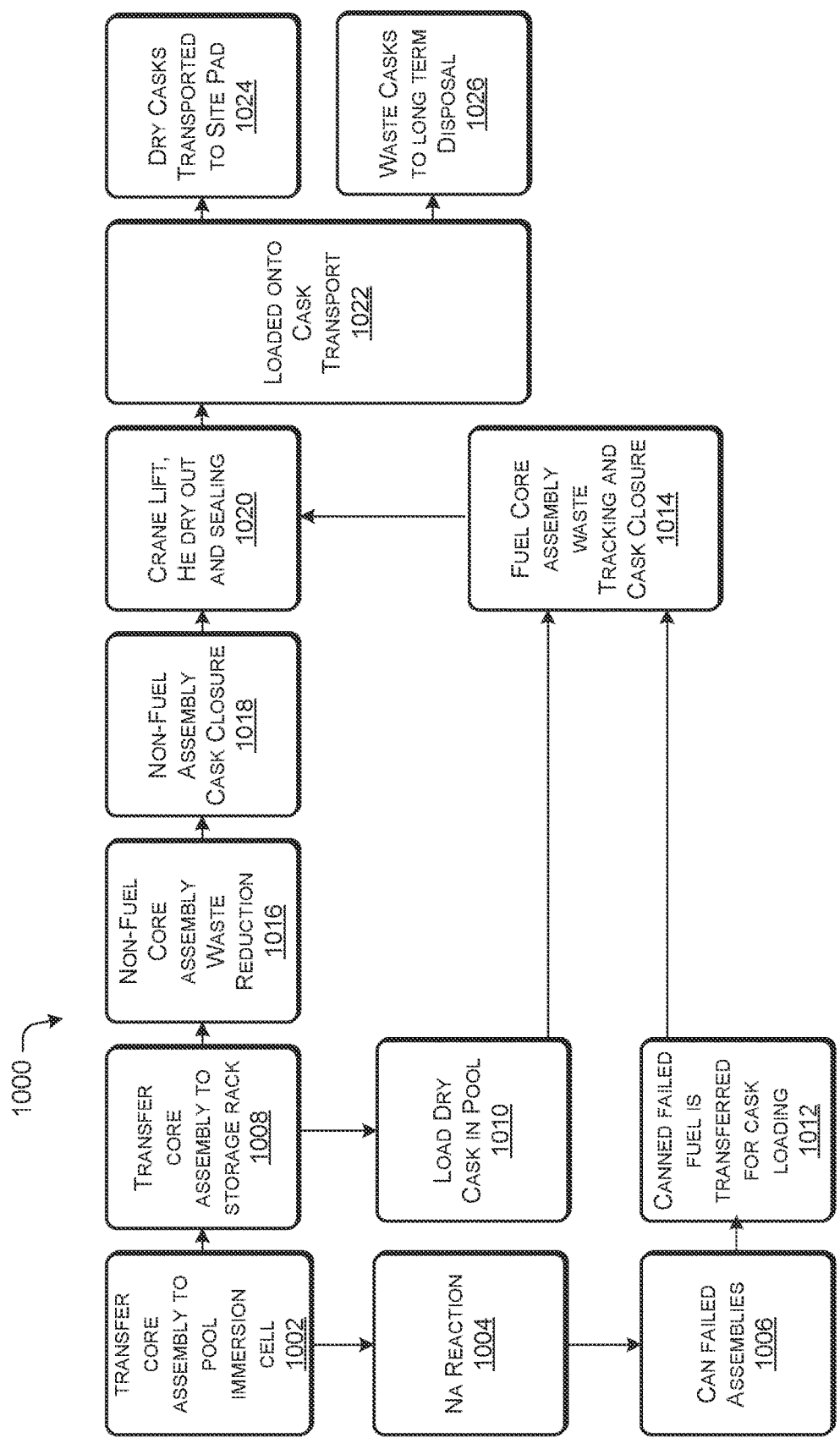
FIG. 10 is a sample process diagram for storing irradiated core assemblies, in accordance with some embodiments.

FIG. 10 illustrates a sample process flow for pool storage and wet cask loading. At block 1002, a core assembly is transferred to the pool immersion cell. In some cases, the pool immersion cell has sufficient volume such that there is little to no risk of building pressure from hydrogen production. At block 1004, the sodium is reacted, such as with water as described herein. In some cases, a gas is passed over and/or through the core assembly to firstly encourage the removal of any sodium within the core assembly. The gas may also be used for leak detection, such as by testing the gas for fission products after it has been passed through the core assembly. The moisture content in the gas may be gradually increased, such as by adding steam to the gas, in order to react with the residual sodium and create a passivation layer of sodium hydroxide to encapsulate any remaining sodium on or in the core assembly.

At block 1006, any failed assemblies are immersed in the pool and canned and secured. In some cases, the failed fuel assemblies are first canned and secured and then introduced in the spent fuel pool. At block 1008, the core assemblies are immersed in the pool of water and transferred to a storage rack within the pool. This may be accomplished by using the pool handling machines.

At block 1010, a dry cask is loaded in the pool with core assemblies using the pool handling machines. In some cases, the core assemblies are loaded after about 10 years, or 12 years, or 15 years of residence time in the pool.

At block 1012, the canned failed fuel assemblies are transferred for cask loading. This may occur prior to loading the core assemblies into the cask.

At block 1014, the fuel core assembly is identified for waste tracking and cask closure. At block 1016, the non-fuel core assemblies are identified for waste tracking and reduction and transferred to waste casks in the pool.

At block 1018, the non-fuel assembly cask is closed in the pool. At block 1020, the casks (both the dry or waste casks) are lifted, dried (such as by using HE), and sealed. At block 1022, the casks are loaded onto a cask transport.

At block 1024, the dry casks are transported to site pad for storage. At block 1026, the waste casks with non-fuel are sent for long-term waste disposal.

Example: Maintenance Strategy for Infrequently Serviced, Sodium Wetted Equipment A transfer adapter may be installed by the crane between the refueling floor and reactor head/rotating plug for each piece of equipment individually removed or installed. A large opening, maintenance floor valve may be placed on top of the associated transfer adapter. The volume of the transfer adapter may be inerted, such as with argon, for the equipment transfer. A large component transfer cask may be installed on the floor valve by RB crane, fleet crane assembly, or temporary fleet cask carrier.

The piece of equipment may be hoisted into the large component cask through the transfer adapter and the cask may be handled by the RB crane, fleet crane, or fleet cask carrier for transport to a maintenance/waste handling building for offsite shipment.

Example: Failed Fuel Handling

If a failed fuel assembly (breached pins) is routed for disposal, it may be processed through the pool immersion cell and the assembly may be canned in the PIC before it is stored in SPF until the wet cask loading process is begun. A failed fuel assembly may have a breach in the cladding which allows communication between the inside of the fuel pin with the exterior environment. In some cases, a detection system can determine if there are fission products within the inert gas used to remove the sodium from the fuel assembly. In some cases, gamma spectroscopy may be used to detect neutrons emanating from a fuel assembly, which can be used to detect a failed fuel assembly. In some cases, the inert gas is pressurized to aid in detection of leaks.

Example FSF Additional Uses

The FSF may provide the operations floor space for new fuel receipt and all spent fuel processing. It may also provide crane and large cask floor space for all non-routine reactor maintenance to remove components such as the refueling port lift, IVTM, control rods, EM pumps, intermediate heat exchanger (IHX), and sodium traps.

Additional floorspace may also be provided for outage support or for breakdown maintenance of casks, reactor components, or radioactive decontamination operations. The floor space may also be used for mockups of critical reactor operations or training evolutions.

Example Sodium Removal Machine

Figure 11:
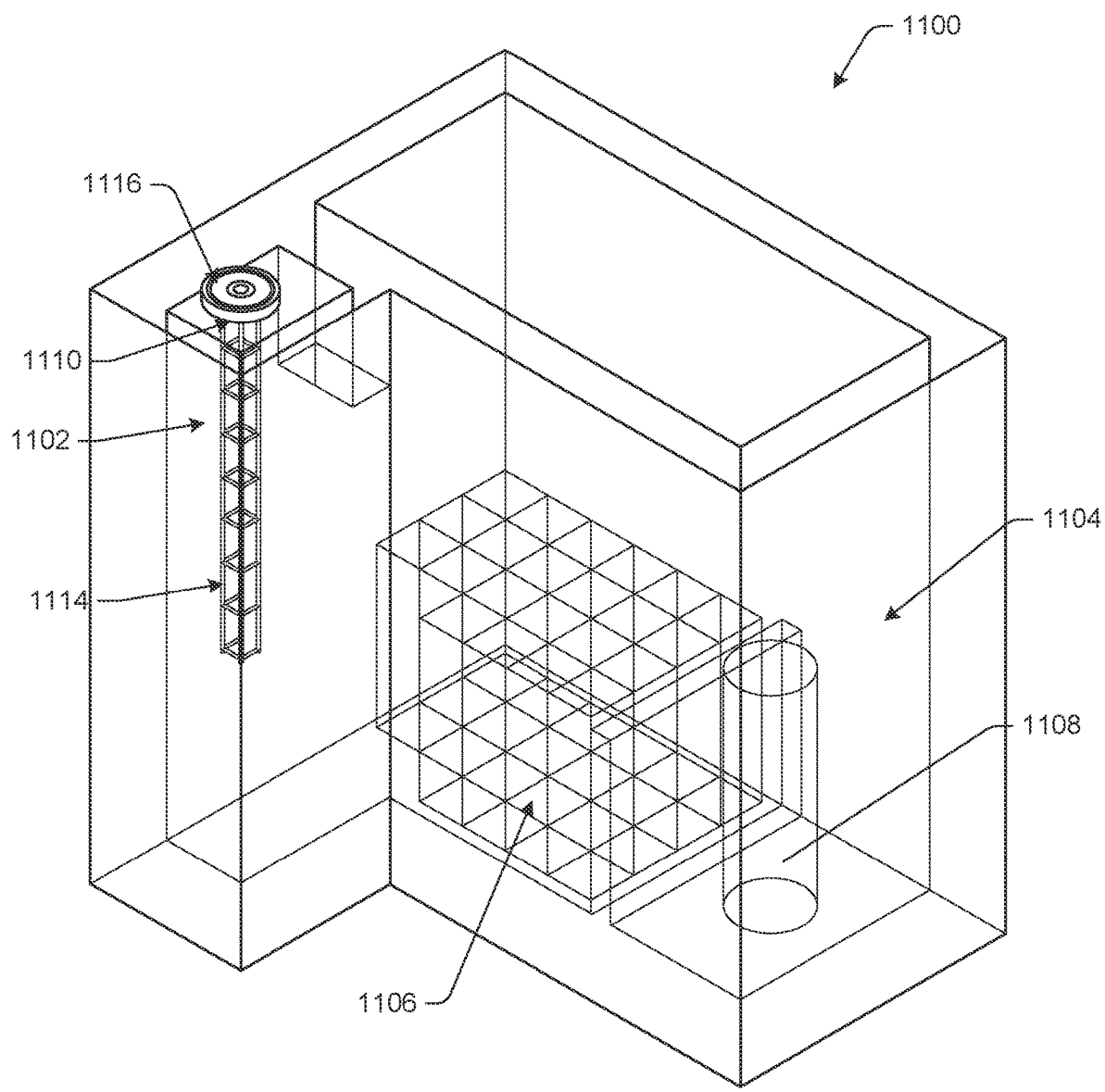
FIG. 11 is a perspective illustration of a pool immersion (PIC) cell showing an example location of a sodium removal machine, in accordance with some embodiments.

With reference to FIG. 11, a pool immersion cell 1100 (PIC) is shown illustrating an example location of a sodium removal machine 1102, in accordance with some embodiments. Many sodium fast reactors (SFRs) remove core origin "primary" sodium from discharged core assemblies in order to reduce potential fire hazards and perform more favorable manipulation and storage activities. The structure for removing the sodium varies with each reactor design, but embodiments of an especially suitable system and methods are described herein.

In many cases, a pressurized circulation of a liquid-laden inert gas is followed by a water flush with a final drying step. Facilities required to accomplish this in many prior designs require an entire room with a controlled atmosphere, or in some cases, a stationary vessel with a lid into which the core assembly is inserted, processed, and then removed. Alternative methods that have been proposed include slowly immersing the core assembly into a tank containing water that reacts with the residual sodium. In some cases, prior approaches have proposed using $CO_2$ and/or an alcohol rinse in lieu of the water-laden gas.

As shown in FIG. 11, a sodium removal machine 1102 removes primary sodium from wetted core assemblies that have been discharged from the reactor and also introduces the core assemblies to the spent fuel pool 1104. The spent fuel pool 1104 may contain spent fuel pool racks 1106 (SFP racks) for storing core assemblies and one or more dry storage casks 1108 for storing core assemblies after a suitable cool down period in the SFP racks. The illustrated and described machine is a compact, high-safety, more efficient, and lower cost alternative to traditional sodium removal facilities and methods.

According to some embodiments, the sodium removal machine 1102 is made up of three primary assemblies: a receiver 1110, a cleaning vessel (not shown), and an elevator 1114. The receiver is configured to couple with the fueling floor valve 1116 and contains one or more fluid process connections. The receiver may be static and at one end, is coupled to the fueling floor valve, and at an opposing end, is selectively coupled to a cleaning vessel. According to some embodiments, the cleaning vessel is sized to receive a core assembly therein. A core assembly may be any assembly that is configured to be removed from the reactor core, and may include, without limitation, spent fuel assemblies, partially spent fuel assemblies, reflector assemblies, fertile fuel assemblies, reactivity modifying structures, neutron absorbing assemblies, among others. As used herein, the terms core assembly and core component may be used interchangeably in that the cleaning vessel may receive a core assembly or a core component without any modifications to the cleaning vessel.

In some cases, the cleaning vessel is only slightly larger in diameter than the core assembly, such as having a diameter than is 5%, or 10%, or 15%, or 20%, or 33%, or 50% larger than the diameter of the core assembly. For example, where a hexagonal core assembly has a cross sectional dimension of about 6 inches from flat to flat, the cleaning vessel may be 7", 8", 9", 10", 12" or more in diameter. The cleaning vessel may be longer than the fuel assembly and may include one or more fluid inlets near a top end for introducing fluids, and a collection space near the bottom for collection and removal of cleaning fluids. The cleaning fluids may be recirculated from the bottom of the cleaning vessel to the top of the cleaning vessel for a twice through cycle, or a recirculating cycle. The cleaning fluids may ultimately be removed from the cleaning vessel and may undergo analysis for the continued presence of sodium or other components.

According to some embodiments, the cleaning vessel has a length that is longer than the length of a core assembly, such that the core assembly can fit entirely within the cleaning vessel. In some cases, the cleaning vessel is only slightly longer than the core assembly, and in some cases, the cleaning vessel length is 10%, or 20%, or 30%, or 50%, or more longer than the core assembly. In other words, in some cases, the core assembly occupies over half the volume of the cleaning vessel, and in some cases, the core assembly occupies over 60%, or over 70%, or over 80% or over 90% or more of the volume of the cleaning vessel.

According to some embodiments, the sodium removal machine 1102 is configured to clean discharged core assemblies of primary sodium and translate them to the spent fuel pool. It does so by encapsulating the discharged core assembly into the cleaning vessel and introducing a cleaning fluid, which in some cases may be water or a water-laden inert gas, and then lowers the discharged core assembly into the spent fuel pool via the elevator 1114.

Figure 12:
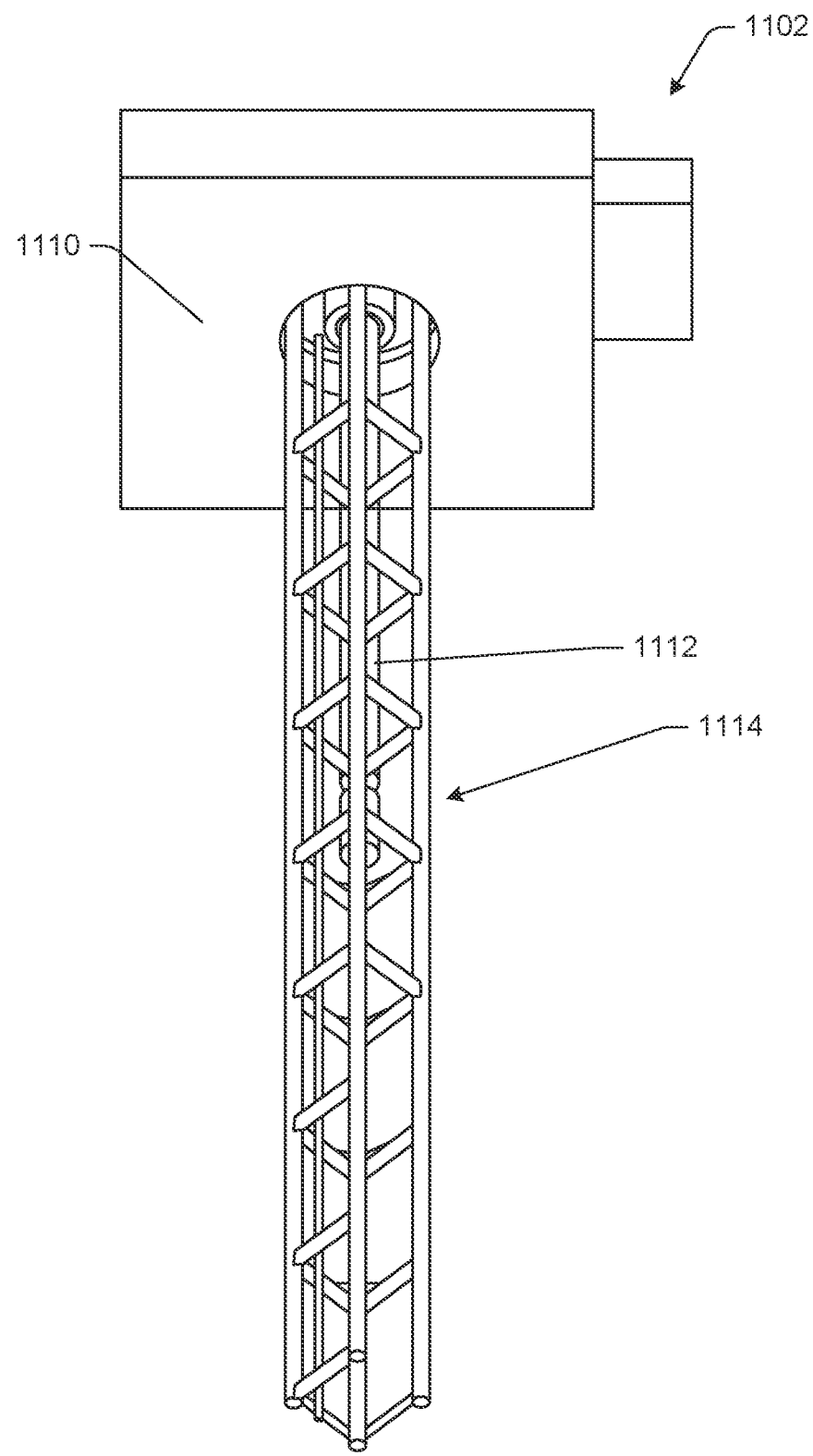
FIG. 12 is a perspective illustration of a PIC machine, in accordance with some embodiments.

FIG. 12 illustrates the sodium removal machine 1102 from below showing the receiver 1110, the cleaning vessel 1112, and the elevator 1114. In some cases, the receiver 1110 remains in a fixed position in the ceiling of the pool immersion cell which also forms the floor of the fuel transfer area. The elevator 1114 is configured to couple with the cleaning vessel 1112 and lower the cleaning vessel 1112 into the spent fuel pool 1104. In this way, the cleaning vessel 1112 may be sealed and introduced into the spent fuel pool with a core assembly inside the cleaning vessel 1112.

Figure 13:
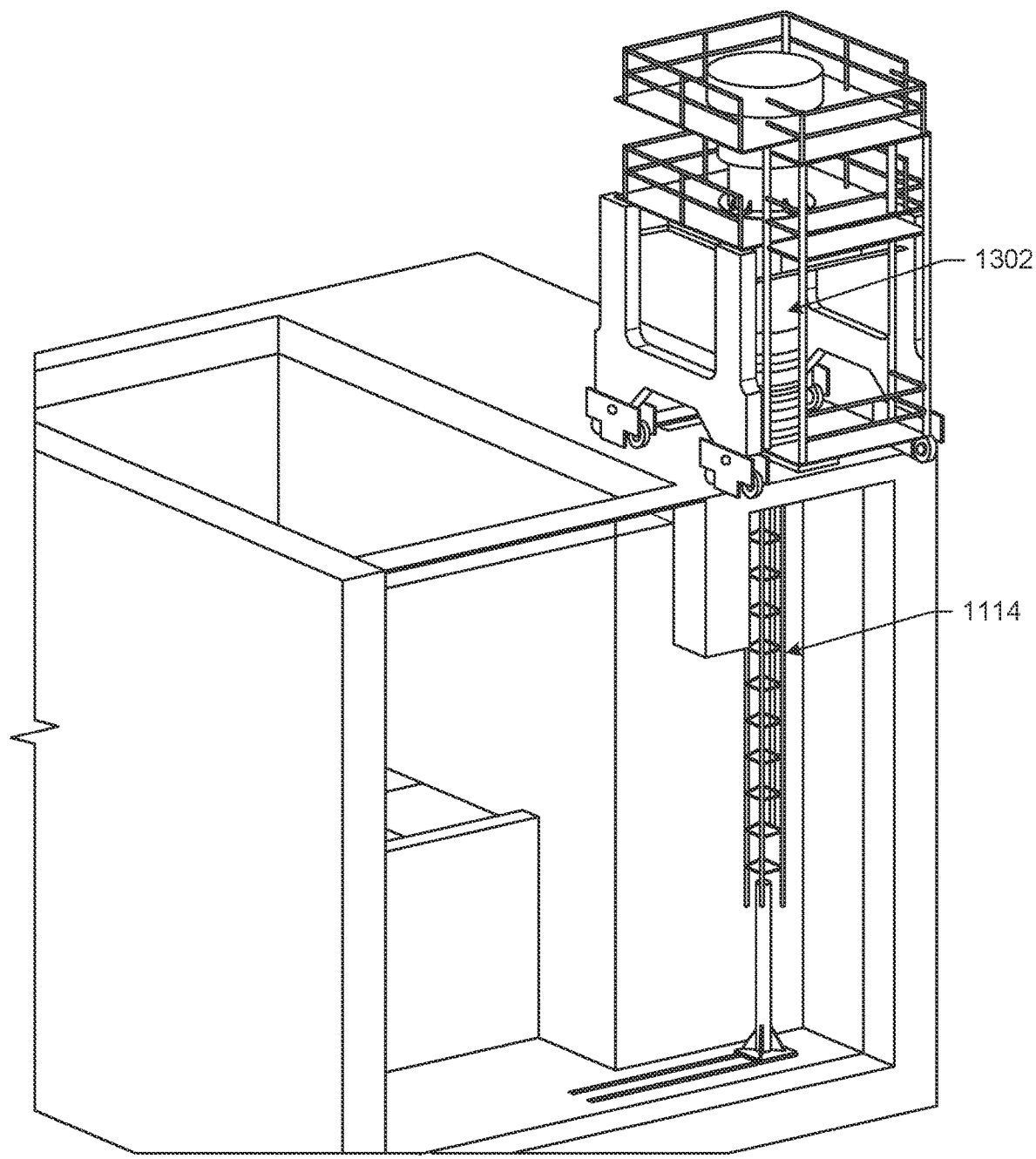
FIG. 13 illustrates a bottom loading transfer cask (BLTC) coupling with an embodiment of the PIC machine, in accordance with some embodiments.

With reference to FIG. 13, a bottom loading transfer cask (BLTC) 1302 delivers a discharged core assembly from the nuclear core to the fueling floor valve. The BLTC couples with the fueling floor valve from above to create a seal for handing off the discharged core assembly. From below the fueling floor valve, the receiver is coupled to the fueling floor valve and additionally coupled to the cleaning vessel. Once the BLTC is coupled to the fueling floor valve, the discharged core assembly may be lowered through the fueling floor valve, through the receiver, and into the cleaning vessel. The cleaning vessel 1112 may remain coupled to the receiver during the core assembly cleaning process after which the cleaning vessel may be lowered into the spent fuel pool and the cleaning vessel 1112 may be transferred to the PIC trolley which can maneuver the core assembly to be stored in the SFP racks. In some cases, the cleaned core assembly is removed from the cleaning vessel prior to storage in the SFP racks. In some cases, the cleaning vessel 1112 may also be removed and stored separately when operational needs require the elevator 1114 and trolley to be empty.

Figure 14:
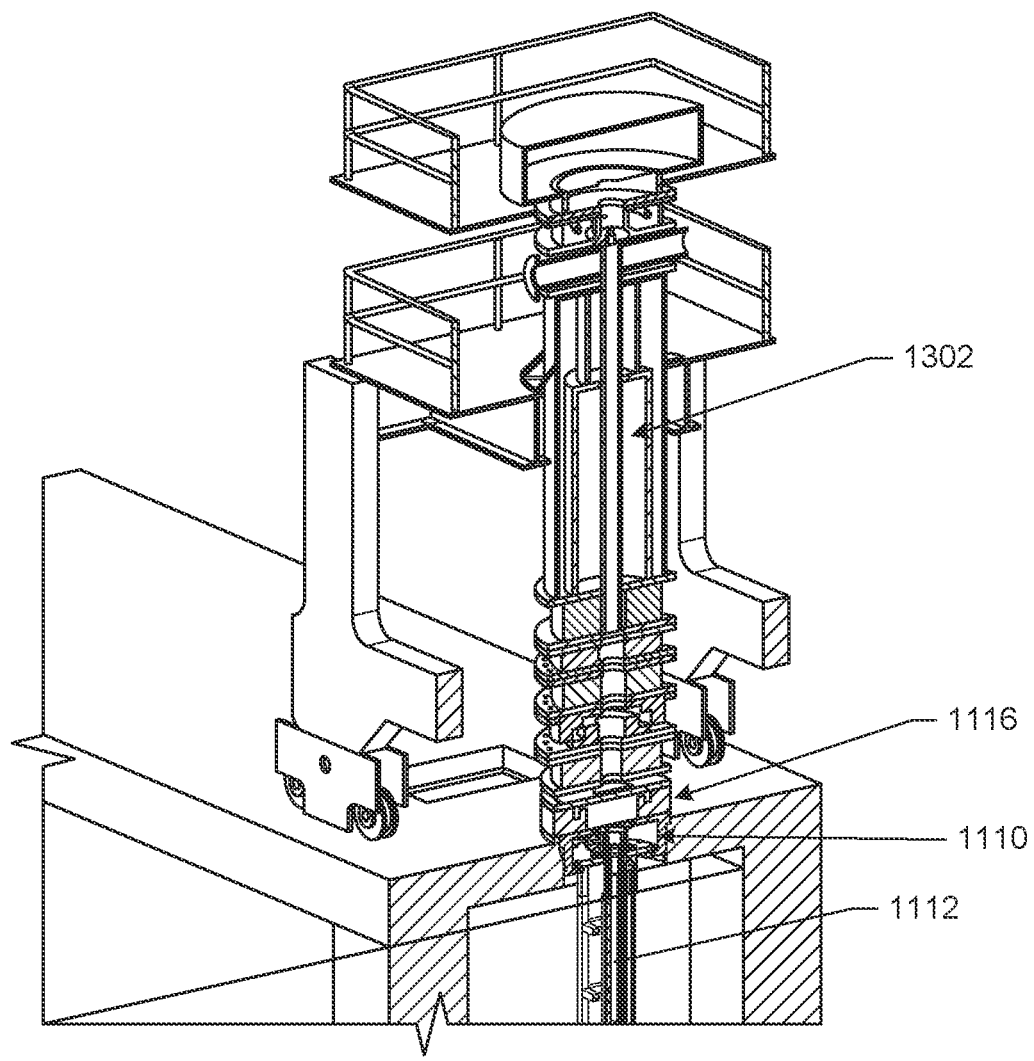
FIG. 14 is a cross-sectional illustration showing the mating structure of the BLTC with the PIC machine, in accordance with some embodiments.

With additional reference to FIG. 14, a partial cutaway view of the BLTC 1302 and receiver 1110 are shown. The BLTC 1302 may be a mobile transfer unit that receives a discharged core component at the EVST 404 and may convey the core component to the fueling floor and take up a position above the fueling floor valve 1116. The BLTC 1302 may couple with the fueling floor valve 1116 and then lower the core assembly through the fuel floor valve into a waiting cleaning vessel. The cleaning vessel captures the core assembly and the fueling floor valve closes and the BLTC can be repositioned and/or retrieve another core component.

For example, a core assembly may pass from the BLTC (not shown) through the fueling floor valve and through the receiver 1110 and enter the cleaning vessel 1112. One or more supply and return lines 2112 may provide fluid communication with the receiver and internal to the cleaning vessel 1112. For instance, when the cleaning vessel 1112 is coupled with the receiver 1110, there may be a mechanical coupling 2118 to maintain the cleaning vessel 1112 adjacent the receiver 1110, and there may also be a fluid coupling 2120 that allows one or more fluids delivered to the receiver 1110, such as by supply lines 2112, to enter the cleaning vessel 1112. In some cases, one or more vessel drain tubes 2114 allow the fluid entering the cleaning vessel 1112 to be withdrawn from the cleaning vessel 1112. In some cases, a process return port 2116 allows a pathway for fluids using in the cleaning of one or more core assemblies 2110 to be returned for processing or further cleaning of the fluid. As described, the fluid may be liquid, gas, or a combination that is suitable to clean the core assemblies 2110 prior to the core assemblies 2110 being moved into the PIC and the spent fuel pool. Of course, the described embodiment is only provided as an example, and the specific components, interfaces, and structures may take any of a variety of configurations that embody the concepts described herein.

Figure 15:
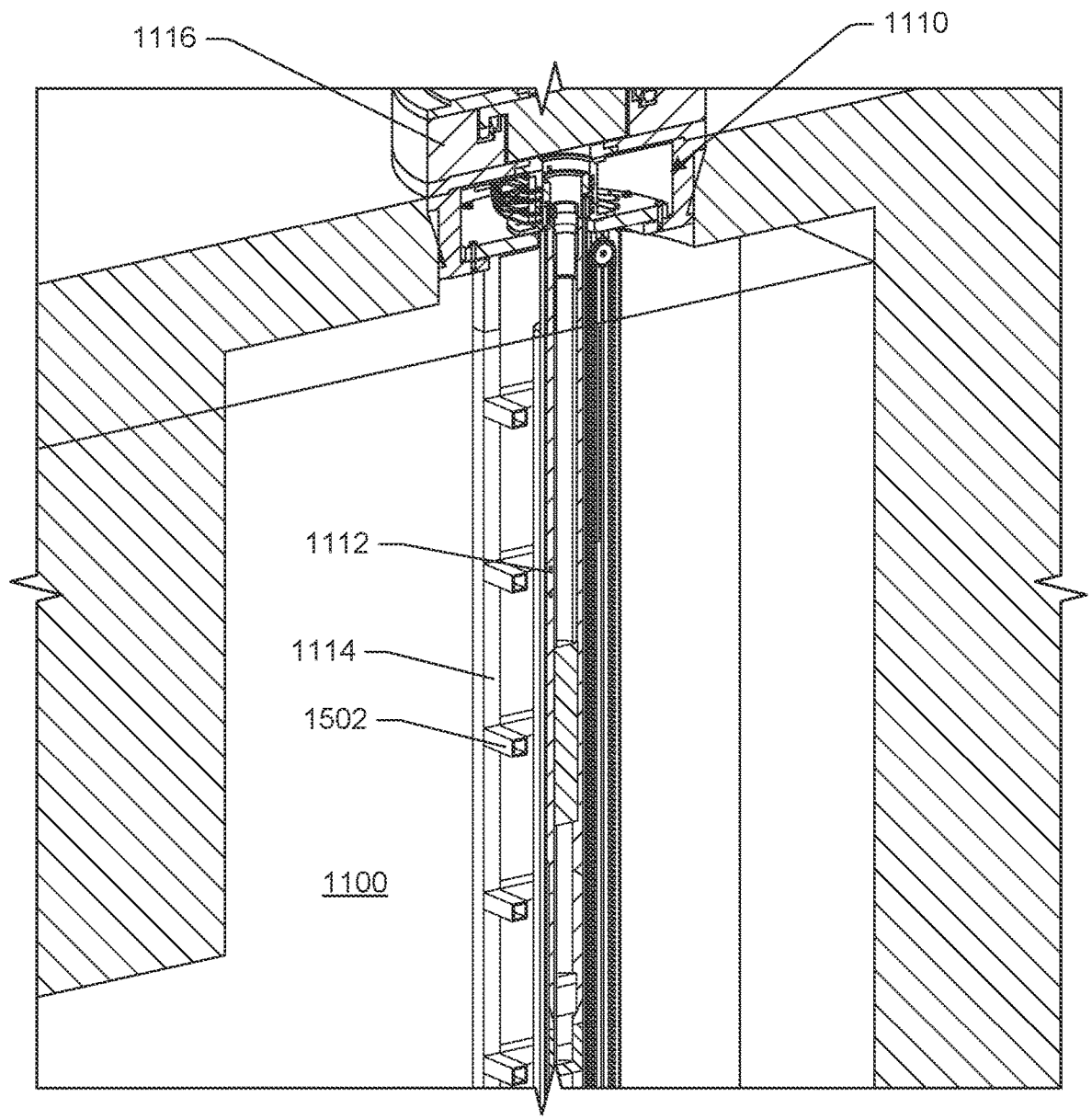
FIG. 15 is a partial cutaway view of a PIC machine showing a cleaning vessel, in accordance with some embodiments.

FIG. 15 illustrates the sodium removal machine elevator 1114 in accordance with some embodiments. The elevator 1114 includes a frame 1502 that defines a track along which the elevator 1114 is configured to lower and/or raise the cleaning vessel 1112. The elevator may convey the cleaning vessel 1112 through any suitable structure, such as, without limitation, pulleys, chains, motors, wheels, block and tackle, power screws, or gears, among others.

The cleaning vessel 1112 may be secured to the elevator 1114 by a carriage which may include any suitable mechanism, such as clamps, interference fit, grapple, hooks, clips, magnetism, slots, keyways, or other suitable structure for securing the cleaning vessel 1112 to the carriage. In some cases, the cleaning vessel 1112 is releasably secured to the elevator 1114 to allow selective attachment and removal of the cleaning vessel from the elevator 1114. In some cases, a handling feature releasably secures the cleaning vessel to the elevator 1114. In some cases, the cleaning vessel 1112 is releasably secured to the elevator 1114 by a basket with a handling feature that mates to the elevator carriage. The handling feature may be a cooperating slot that receives protrusion to couple the cleaning vessel 1112 with the elevator 1114. The elevator 1114 is configured to travel between an upper position in which the cleaning vessel 1112 is coupled to the receiver 1110 and a lower position in which the cleaning vessel 1112 may be deposited into a PIC trolley.

Figure 16:
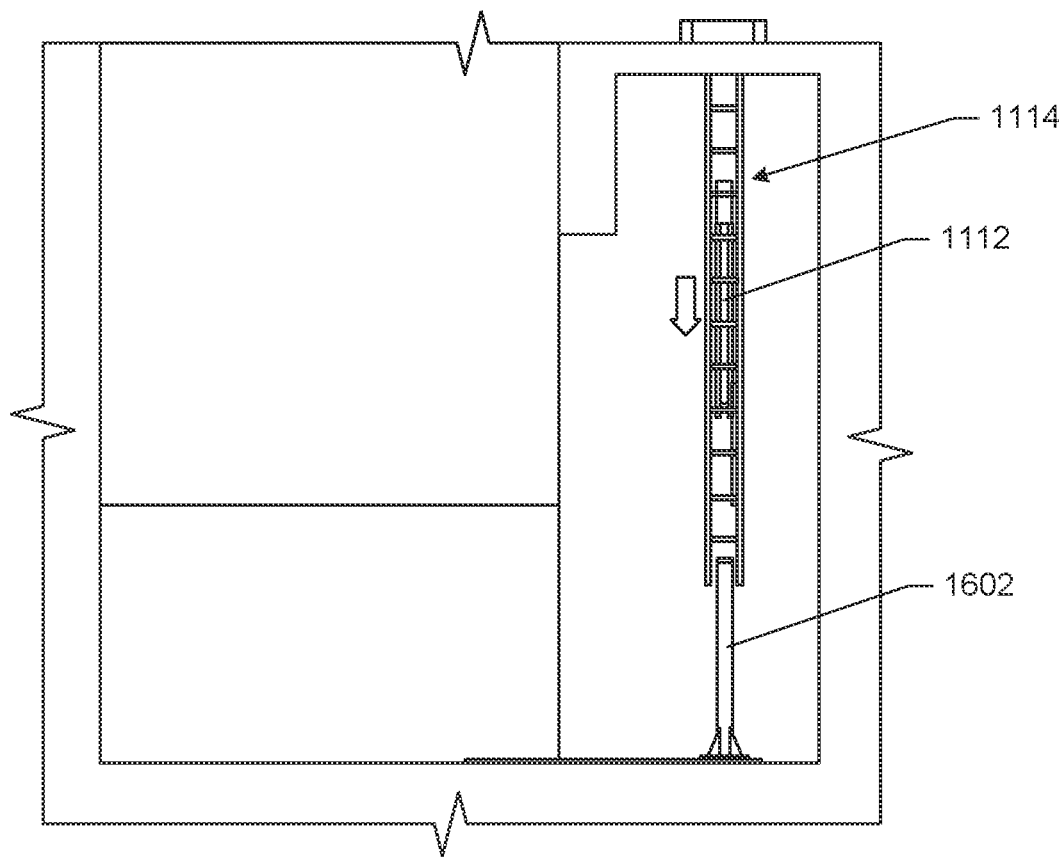
FIG. 16 illustrates a motion of a PIC machine, in accordance with some embodiments.

With reference to FIG. 16, the elevator 1114 is shown descending from the upper position enroute to the lower position. A PIC trolley 1602 is shown in a position to receive the cleaning vessel 1112 and discharged core component within the cleaning vessel 1112. In some cases, the core component is cleaned of residual sodium while in the upper position and coupled to the receiver 1110, and only after cleaning is it decoupled from the receiver 1110 and lowered to the PIC trolley 1602.

Figure 17:
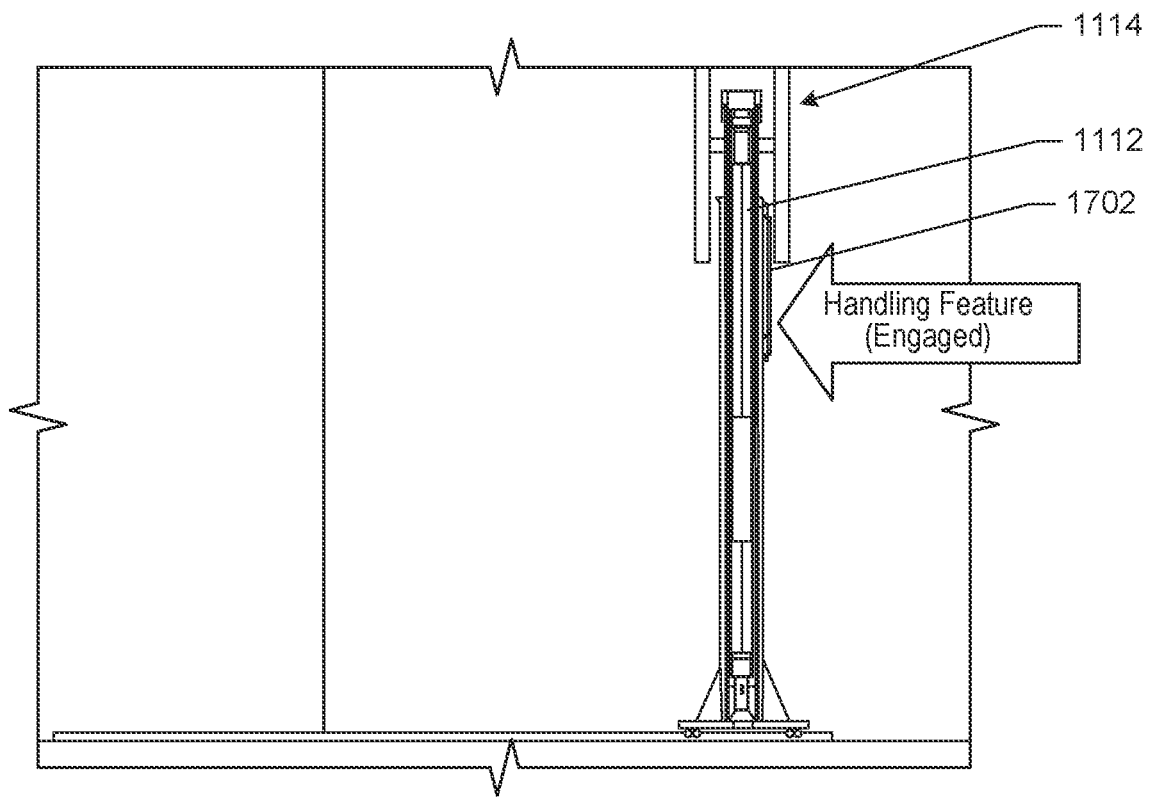
FIG. 17 illustrates a PIC machine elevator at a lower travel limit, in accordance with some embodiments.

With additional reference to FIG. 17, as the elevator 1114 nears or reaches the lower position, the handling feature may be able to decouple from the cleaning vessel 1112 and transfer the cleaning vessel 1112 to the PIC trolley 1602. It should be appreciated that the PIC trolley is one of several ways of receiving the cleaning vessel 1112 into the pool immersion cell, and that other ways of manipulating the cleaning vessel 1112 and/or the discharged core component are equally application. For example, a crane may be used to receive the discharged core component and position the discharged core component within the pool immersion cell and alternatively also locate the discharged core component within a PIC rack within the spent fuel pool. In some cases, a crane is used in conjunction with the PIC trolley. For example, the PIC trolley may receive the cleaning vessel 1112 from the elevator 1114 and then convey the cleaning vessel 1112 to an area adjacent the SFP rack 1106 (FIG. 10). A crane may then retrieve the cleaning vessel 1112 from the PIC trolley 1602 and position the cleaning vessel 1112 within the SPF rack 1106 for storage in the spent fuel pool. In some cases, the discharged core component may be removed from the cleaning vessel 1112 and stored in the spent fuel pool for a suitable cooldown period. In the examples in which the discharged core component is removed from the cleaning vessel 1112 for storage, the cleaning vessel 1112 may be conveyed by the PIC trolley 1602 to the elevator 1114 where it may be coupled to the elevator 1114 and raised to its upper position and await a subsequent discharged core component.

Figure 18:
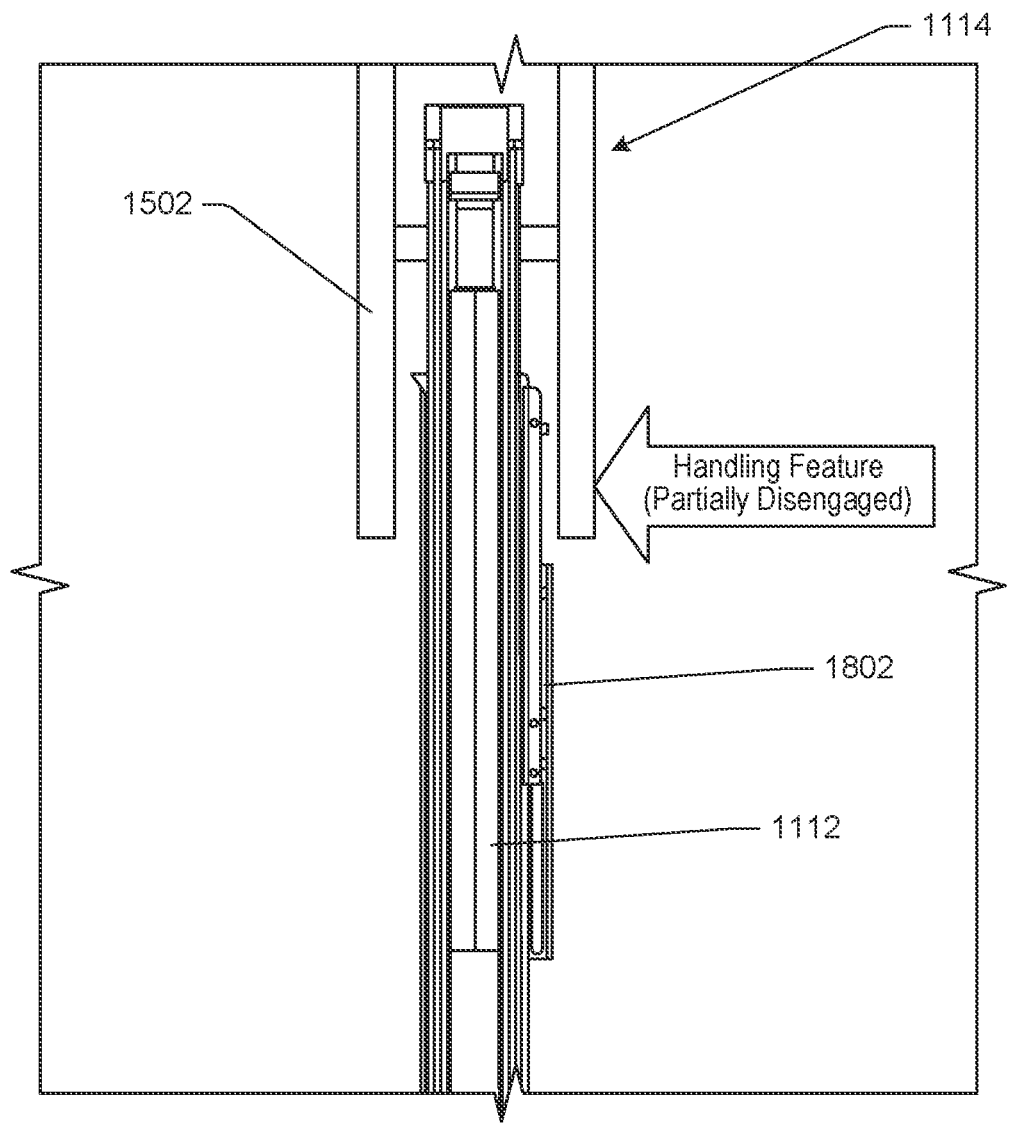
FIG. 18 illustrates a PIC machine disengaged with a cleaning vessel, in accordance with some embodiments.
Figure 19:
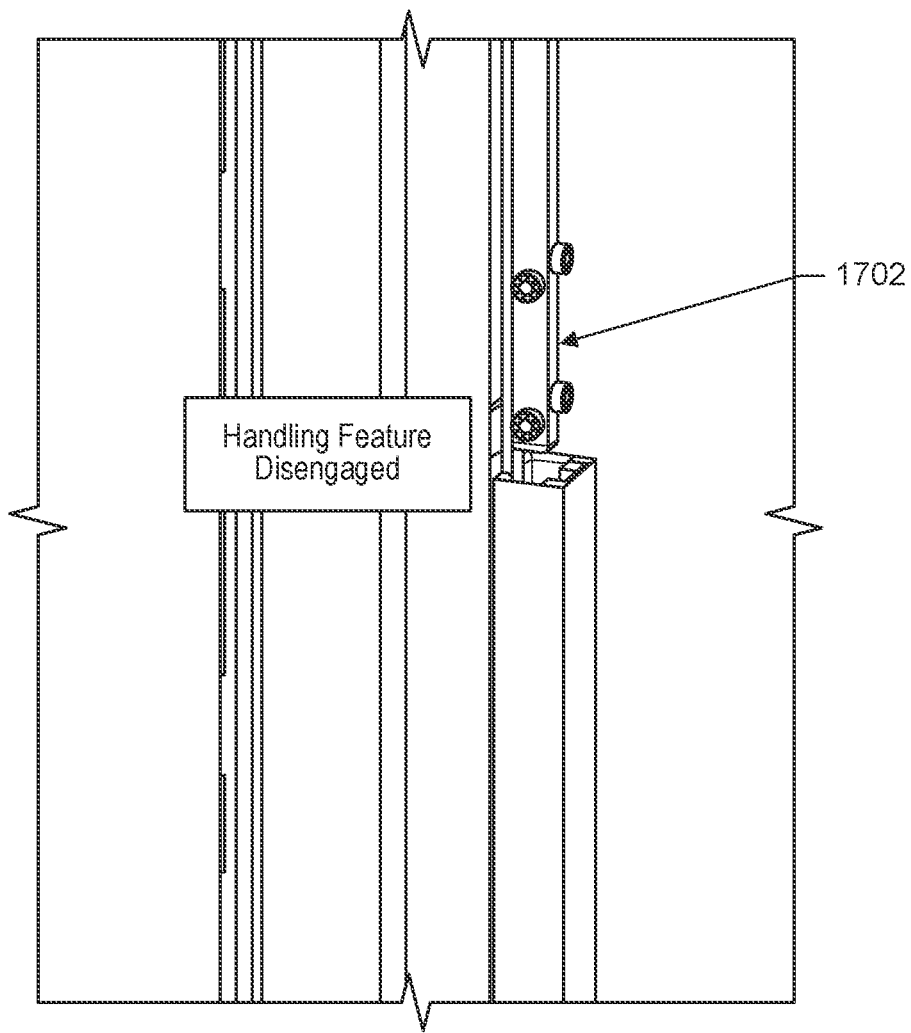
FIG. 19 illustrates a PIC machine at full overtravel disengaging with a cleaning vessel, in accordance with some embodiments.

With reference to FIGS. 18 and 19, the elevator 1114 is shown with the carriage 1802 and its handling feature 1702. According to some embodiments, as the carriage 1802 travels beyond the elevator frame 1502, the handling feature releases the cleaning vessel 1112. This may be accomplished, for example, by mechanical interference between the carriage 1802 and a portion of the frame 1502 that causes the carriage 1802 to release the cleaning vessel 1112. In some cases, a sensor may be used to sense when the carriage 1802 is near or at the lower travel limits and a controller may send a signal to the carriage 1802 to release the cleaning vessel 1112 into the PIC trolley. In some cases, the handling feature is entirely passive and requires no actuation to release the cleaning vessel 1112 from the carriage 1802. According to some embodiments, the handling feature includes a strongback rib with bearings. The bearings may be permanently affixed to a basket that holds the cleaning vessel. The bearings can be configured to slide down into a T-slot that is affixed to the elevator carriage. The basket may be positioned at the end of the trolley's travel so that its rib is directly above the T-slot. As the elevator carriage rises, it captures the first bearing set inside the T-slot and eventually bottoms out. This motion continues upward to lift the basket (with cleaning vessel) off of the trolley.

Figure 20:
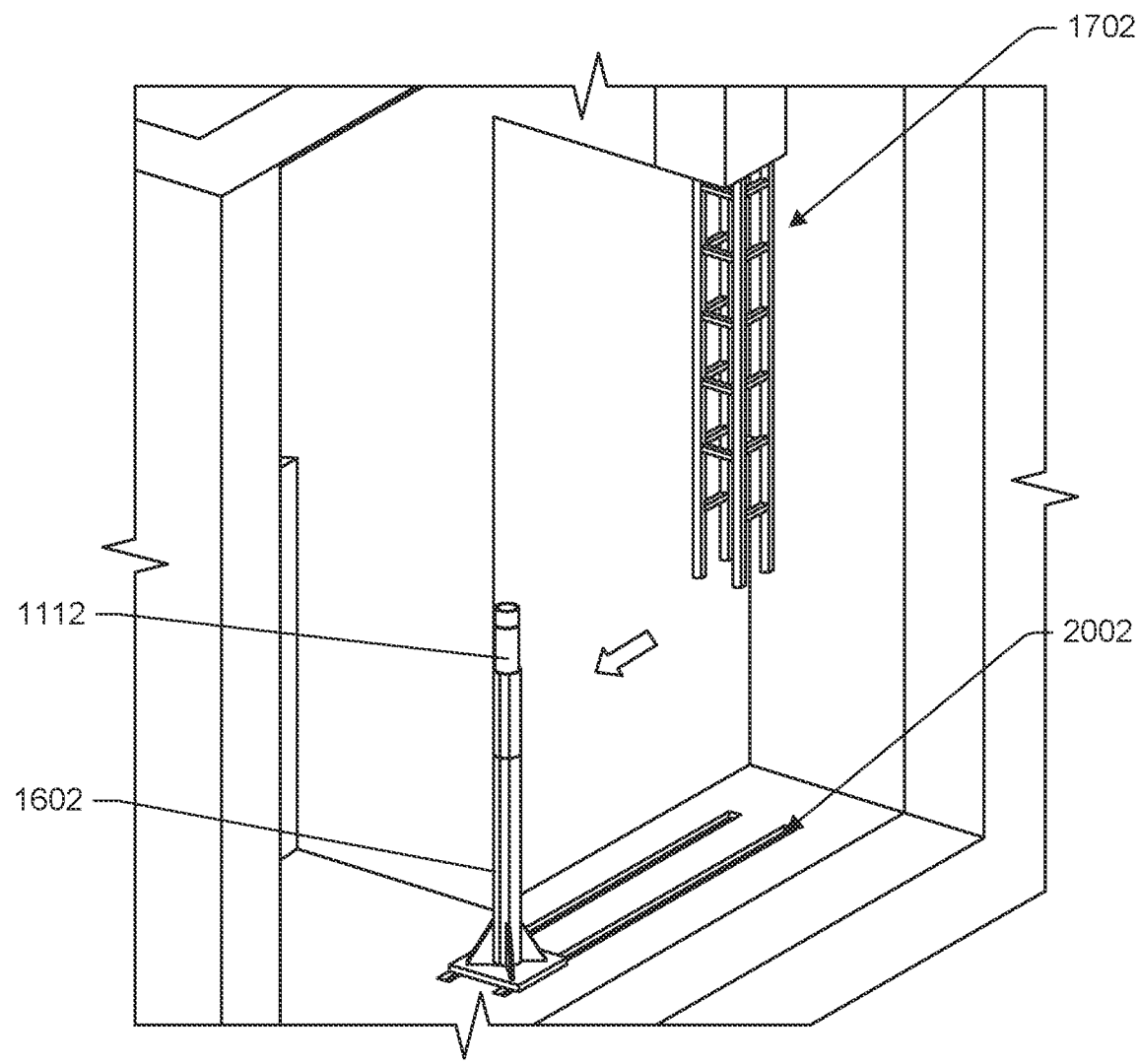
FIG. 20 illustrates a PIC trolley with cleaning vessel moving to the spent fuel pool (SPF), in accordance with some embodiments.

FIG. 20 illustrates the cleaning vessel 1112 being free of the carriage and conveyed by the PIC trolley 1602. In some cases, the PIC trolley 1602 may ride on rails 2002 to convey the cleaning vessel 1112 from a first location to a second location. In some cases, the first location may be below the elevator 1114, and the second location may be adjacent to the SFP racks in the spent fuel pool. The PIC trolley 1602 may be moved between the first position and the second position by motors, by pulleys, by a pull-pull mechanism, by wheels, or some other structure that allows the PIC trolley 1602 to move between the first position and the second position. In some examples, the PIC trolley 1602 may not be constrained by a defined track, but rather, may be free to move within the spent fuel pool and may be controlled by one or more sensors, one or more motors, and/or one or more controllers.

In some cases, the cleaning vessel may be exchanged for a failed fuel canister. The dimensions of the failed fuel canister may be selected such that the failed fuel canister is interchangeable with the cleaning vessel to share the PIC equipment. For example, a failed fuel canister may engage with all the equipment in the PIC, such as the PIC trolley, the elevator 1114, the SFP rack 1106 (FIG. 10), and any cranes or hoists used for conveying the cleaning vessel. Accordingly, in some cases, the PIC may be used as a canister welding and loading station. After welding the canister shut, the failed fuel canister can use the same elevator and trolley as the cleaning vessel and may be stored in the SFP.

Figure 21:
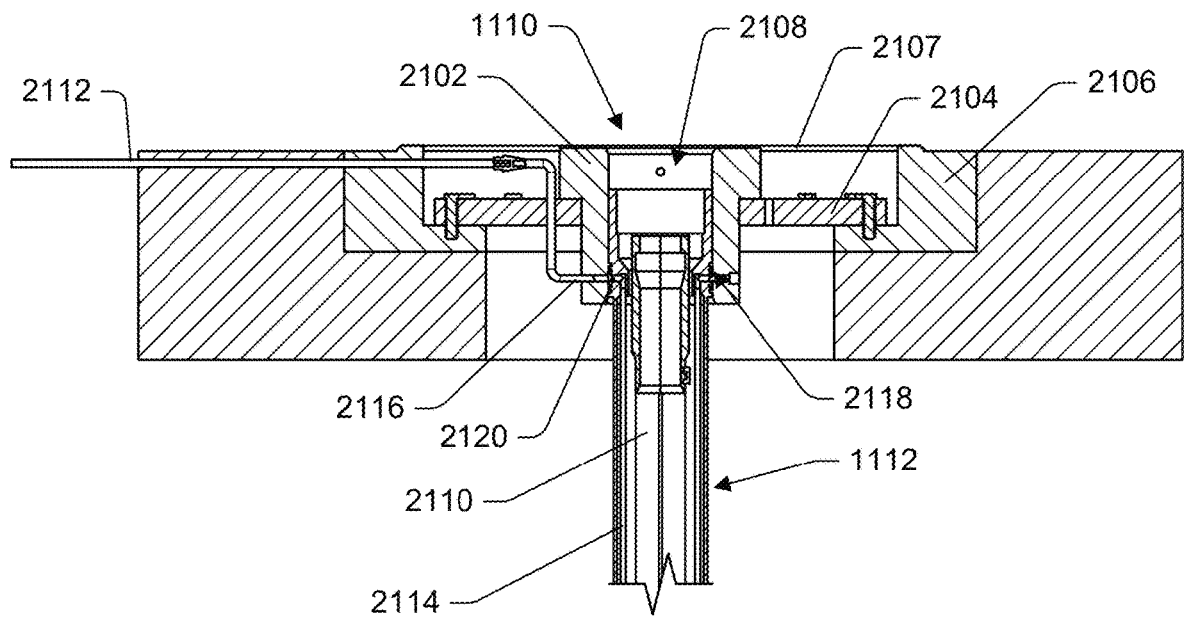
FIG. 21 illustrates the PIC machine and PIC upper components, in accordance with some embodiments.

FIG. 21 illustrates a partial cross-sectional view of embodiments of the receiver 1110 with coupled cleaning vessel 1112. The receiver 1110 may be made up of several parts, such as, for example, a receiver body 2102 that mates with a receiver flange 2104. The receiver flange 2104 may engage with an outer flange 2106 that is formed in the fueling floor and designed to carry the load of the cleaning vessel 1112 transmitted through the elevator frame 1502 (not shown) and receiver flange 2104. A receiver access plate 2107 may allow access to the receiver flange 2104 and/or the outer flange 2106 as desired as well as other components of the receiver 1110. A receiver bore 2108 may be located centrally through the receiver 1110 and may provide a pathway for a discharged core component to enter the cleaning vessel 1112 through the receiver 1110.

For example, a core assembly may pass from the BLTC (not shown) through the fueling floor valve and through the receiver 1110 and enter the cleaning vessel 1112. One or more supply and return lines 2112 may provide fluid communication with the receiver and internal to the cleaning vessel 1112. For instance, when the cleaning vessel 1112 is coupled with the receiver 1110, there may be a mechanical coupling to maintain the cleaning vessel 1112 adjacent the receiver 1110, and there may also be a fluid coupling that allows one or more fluids delivered to the receiver 1110, such as by supply lines 2112, to enter the cleaning vessel 1112. In some cases, one or more vessel drain tubes 2114 allow the fluid entering the cleaning vessel 1112 to be withdrawn from the cleaning vessel 1112. In some cases, a process return port 2116 allows a pathway for fluids using in the cleaning of one or more core assemblies 2110 to be returned for processing or further cleaning of the fluid. As described, the fluid may be liquid, gas, or a combination that is suitable to clean the core assemblies 2110 prior to the core assemblies 2110 being moved into the PIC and the spent fuel pool. Of course, the described embodiment is only provided as an example, and the specific components, interfaces, and structures may take any of a variety of configurations that embody the concepts described herein.

Figure 22:
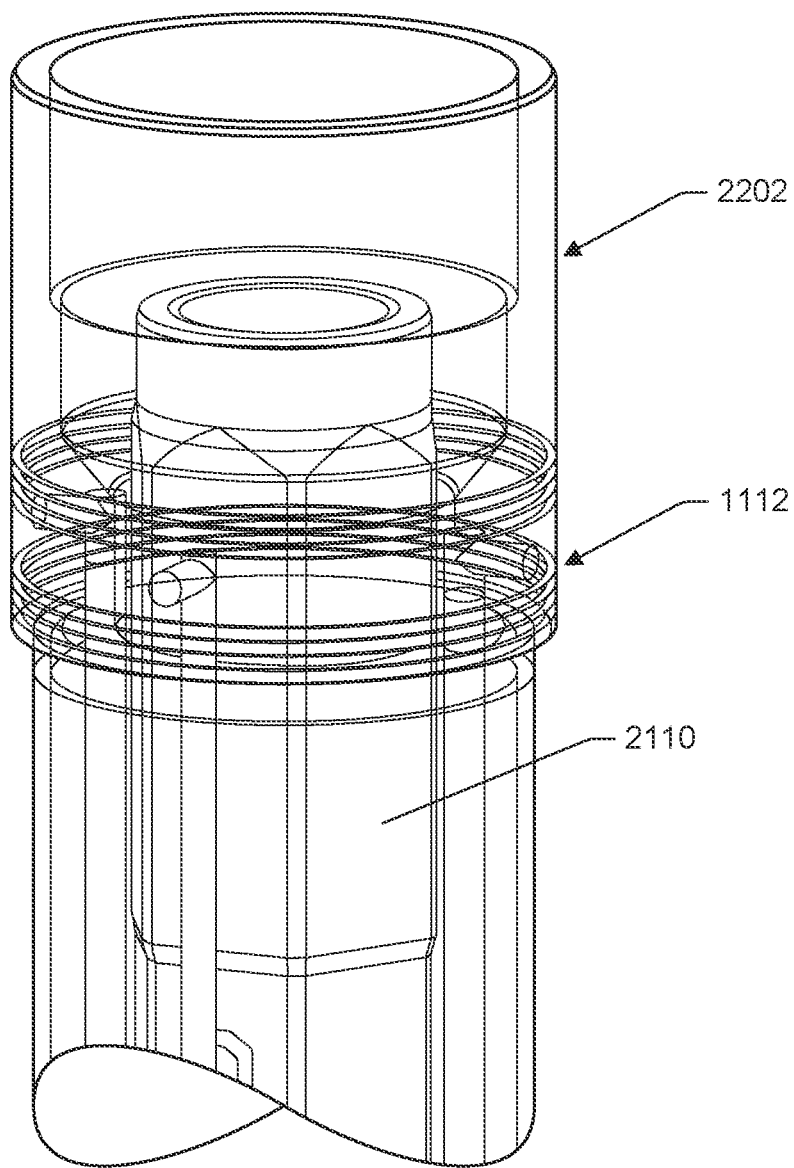
FIG. 22 illustrates an upper area of the cleaning vessel with a core assembly, in accordance with some embodiments.
Figure 23:
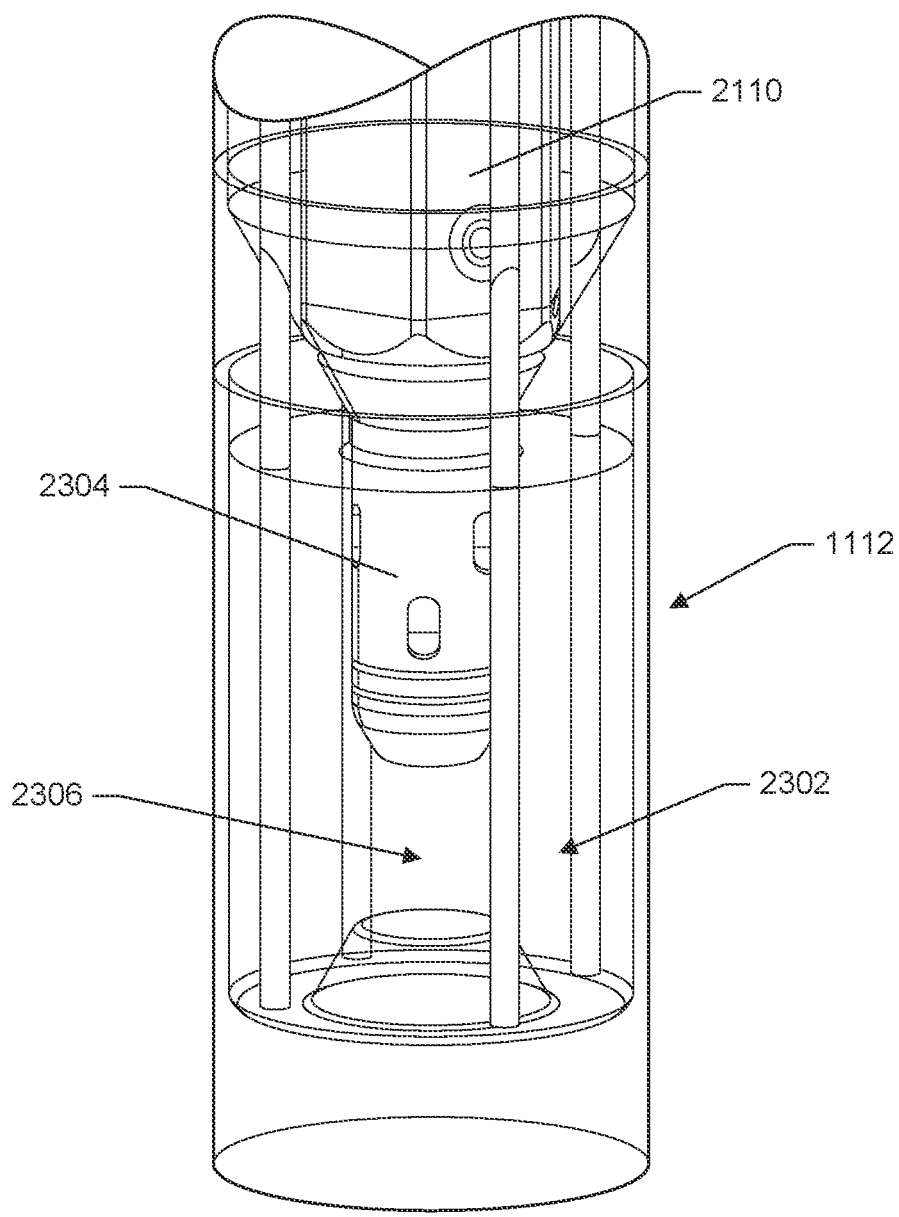
FIG. 23 illustrates a lower area of a cleaning vessel with core assembly, in accordance with some embodiments.

FIGS. 22 and 23 illustrate an upper area and lower area of the cleaning vessel 1112, respectively. The upper area 2202 may include structure that cooperates with the core assembly 2110 to retain the core assembly 2110 within the cleaning vessel 1112. In some cases, the core assembly 2110 has a longitudinal axis, and the structure maintains the core assembly 2110 longitudinal axis substantially aligned with an axis of the cleaning vessel 1112. The structure may include one or more of protrusions, grooves, bosses, pockets, seals such as inflatable seals or ring seals, clamps, locks, cams, or other structure that may retain the core assembly 2110 within the cleaning vessel 1112.

The lower area 2302 of the cleaning vessel 1112 may include structure that supports the weight of the core assembly 2110. The weight supporting structure may include one or more of a shelf, a protrusion, an annulus, a hole formed in a plate, clamps, cams, or other structure that supports the weight of the core assembly 2110 within the cleaning vessel 1112. In some cases, the core assembly 2110 may include a nozzle 2304 that fits within a receptacle formed in the cleaning vessel 1112. The receptacle may include a hole or recess configured to accept the nozzle 2304 and maintain the nozzle 2304 substantially aligned with the longitudinal axis of the cleaning vessel 1112. In some cases, one or more seals allow a pressure differential in an area below the nozzle 2304 and above the nozzle. Furthermore, by providing seals near the nozzle 2304, this encourages the process gas to pass through the interior of the core component.

The lower areas 2302 of the cleaning vessel 1112 may include a chamber 2306, such as a plenum chamber, for collecting fluid, effluent, and other materials that may be introduced into the cleaning vessel 1112 or removed from the core assembly 2110. The chamber 2306 may have return lines disposed therein for returning the collected materials to the top of the cleaning vessel 1112 or to a location outside the cleaning vessel 1112.

Figure 24:
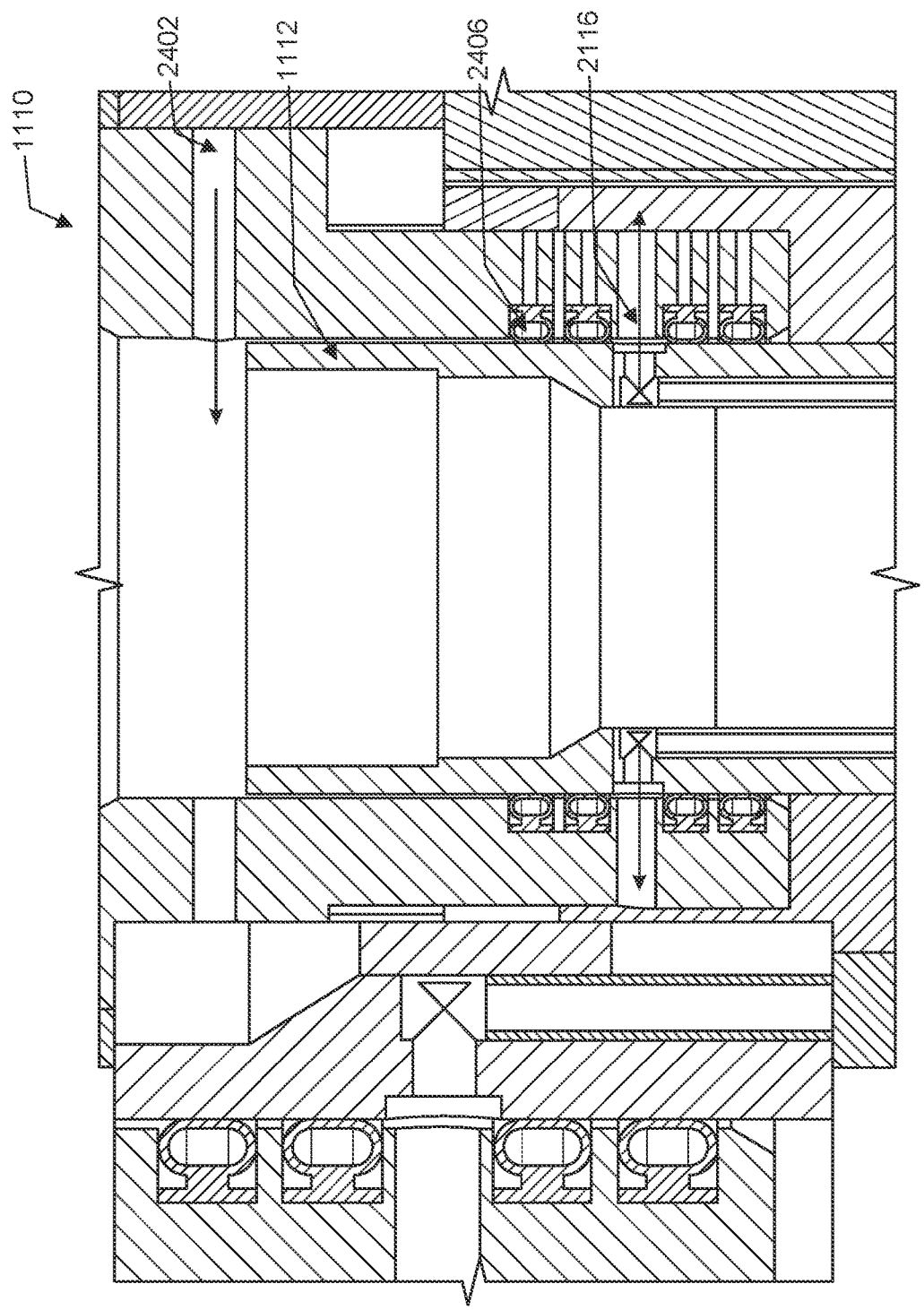
FIG. 24 illustrates a cross-sectional view of a receiver and cleaning vessel with seals and piping connections, in accordance with some embodiments.
Figure 25:
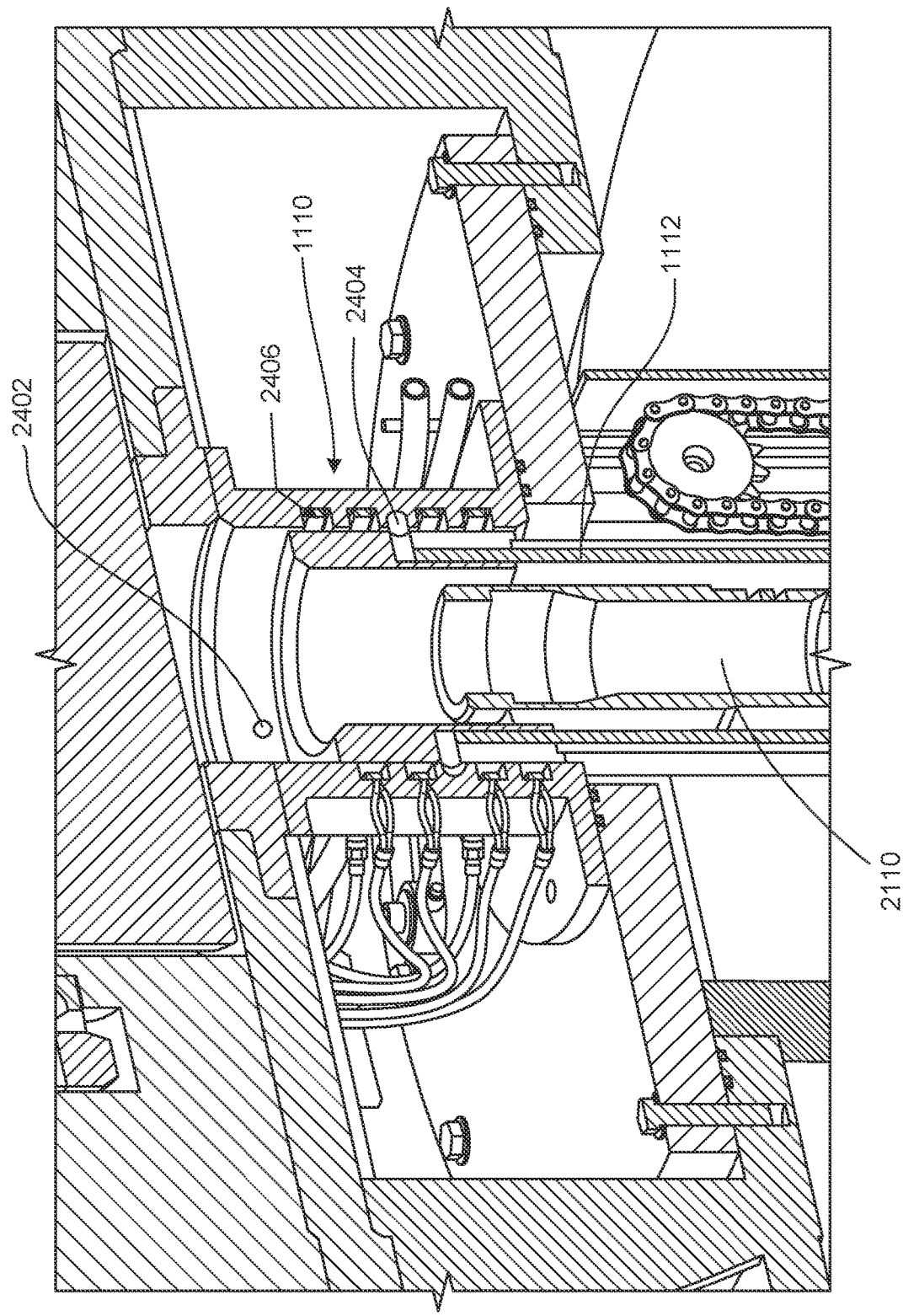
FIG. 25 illustrates a cutaway view of the PIC receiver and cleaning vessel, in accordance with some embodiments.

With reference to FIGS. 24 and 25, the receiver 1110 and cleaning vessel 1112 are shown in cross-section. The receiver 1110 defines a bore for allowing a core assembly to be inserted therethrough and into the receiver 1110. A process supply 2402 allows one or more fluids to be provided into the cleaning vessel 1112, as described in conjunction with other embodiments herein. One or more process returns 2116 may be provided to withdraw the fluid and other materials removed from the core assembly 2110. In some cases, the cleaning vessel 1112 is sealed against the receiver 1110 such as by one or more seals 2406. The seals 2406 may be any suitable seal and may include, for example, O-ring seals, inflatable seals, annular seals having alternative cross-sectional shapes, or any other suitable type of seal that inhibits introduced fluid from passing between the receiver 1110 and the cleaning vessel 1112. The seals therefore encourage any introduced fluid to pass through the cleaning vessel 1112 and pass around and through the core assembly 2110. Once the core assembly 2110 is positioned within the cleaning vessel 1112, the fueling floor valve may be closed and the cleaning vessel 1112, receiver 1110, and the fueling floor valve may cooperated to create a closed boundary. In some cases, the closed boundary may be pressurized, such as by liquid, gas, or a combination, and the closed boundary may contain the pressure which may serve to aid the cleaning fluid in circulating about and within the core assembly. Moreover, a pressurized system may encourage the cleaning fluid to pass through the cleaning vessel 1112 and out the return lines 2404.

In some cases, the fluid couplings into the receiver 1110 are static, in large part because the receiver is static and may be configured to remain in place during the loading, cleaning, and transferring of a core assembly as it progresses from the core to the spent fuel pool for storage. The fluid connections may be removable, such as for cleaning or servicing, as desired. Process fluids may be introduced at the top of the receiver, such as through the process inlets 2402 and directed downward through the core assembly until they arrive at the lower plenum chamber 2306 at the bottom of the cleaning vessel 1112. The fluids may be sent back to the receiver 1110 by drain tubes, such as by a pump, by fluid pressure, or by some other fluid transmitting force. The fluids may exit the cleaning vessel 1112 by one or more process return ports 2404 within the receiver. In some cases, this fluid flow is reversible, such that fluids may be introduce to the bottom of the cleaning vessel 1112 and flow upwardly around and through the core assembly 2110 to further clean the core assembly, as desired.

In some embodiments, the cleaning vessel 1112 remains within the spent fuel pool, even during a cleaning operation of a core component. In other words, when the cleaning vessel 1112 is at the top to of the elevator 1114, it may still be partially or completely submerged within the spent fuel pool. By at least partially submerging the cleaning vessel 1112, heat is removed from the cleaning vessel 1112 to the spent fuel pool.

Once the core assembly 2110 is sufficiently cleaned, the cleaning vessel 1112 is lowered into the spent fuel pool by the elevator 1114. This movement of the elevator 1114 disconnects the cleaning vessel 1112 from the receiver 1110 and allows the cleaning vessel 1112 to be open at the top, which allows water from the spent fuel pool to enter the cleaning vessel 1112 once the open top becomes submerged in the spent fuel pool.

According to some embodiments, the discharged core assembly is enclosed by the cleaning vessel 1112, receiver 1110, and fueling floor valve during cleaning, which reduces the opportunity for radio contamination. This also has the added benefit of simplifying process control, and creating a very small pressure boundary around the discharged core assembly. In prior efforts at cleaning core assemblies, the core assemblies were located within a larger room, and the room was pressurized, filled with a cleaning gas, and then the core assembly could be removed from the cleaning room and sent to the spent fuel pool. By creating the pressure and cleaning boundary around the immediate vicinity of the core component, the cleaning process is much more efficient because it can be conducted faster, cleaning fluid can be forced through the core assembly in more than one direction, the volume of cleaning fluid is substantially reduced, and the cleaning vessel containing the core assembly can be moved from the fueling floor valve, down the elevator, into the spent fuel pool, and to a location adjacent the PIC racks for core assembly storage.

Furthermore, by locating the cleaning vessel 1112 within the PIC, at least a part of the cleaning vessel 1112 can remain submerged in the spent fuel pool, which promotes passive cooling of the cleaning vessel 1112. This eliminates, or at least reduces, the required safety-related cooling equipment, thereby reducing system complexity and cost and maintains the process and fuel temperatures within acceptable levels. The spent fuel pool generally has a large thermal mass in comparison with the cleaning vessel 1112 such that there is not a large temperature change in the spent fuel pool when passively cooling the cleaning vessel 1112. Furthermore, by containing the core assembly in the cleaning vessel, this avoids the typical pH shock on the spent fuel pool.

With historical processes of storing core components in a spent fuel pool, the water level of the spent fuel pool is raised or lowered to accommodate the introduction of a core component. In the described system and methods, the water level does not need to change within the spent fuel pool with the introduction of discharged core components.

Figure 26:
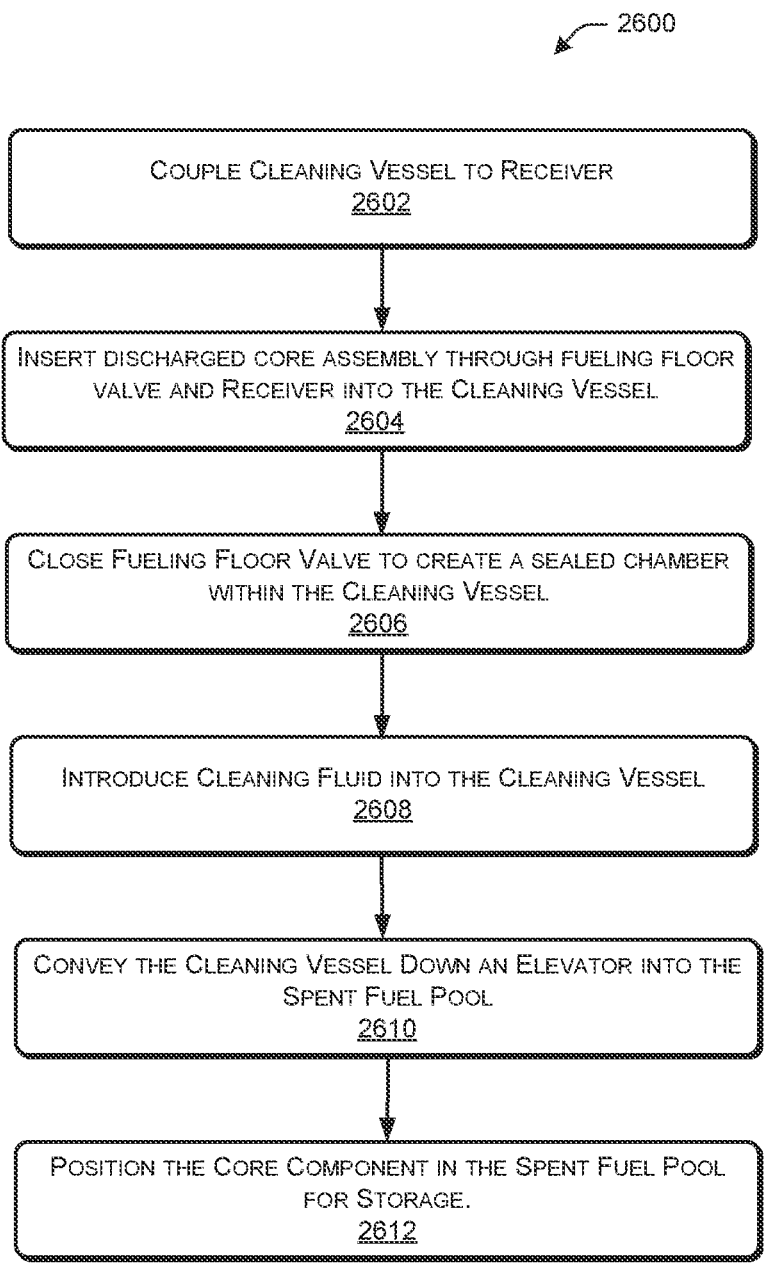
FIG. 26 illustrates a process flow for cleaning a discharged core assembly.

With reference to FIG. 26, a process flow is described as a method for cleaning a discharged core assembly from a nuclear reactor 2600. At block 2602, a cleaning vessel is coupled to a receiver. As described herein, the receiver may be static and coupled to the fueling floor valve. The receiver may further have fluid connections for introducing and removing process fluids.

At block 2604, the discharged core component is inserted through the fueling floor valve, through the receiver, and into the cleaning vessel. The discharged core component may be transferred from the reactor core to the fueling floor valve by any suitable mechanism or method, but in some cases, the transfer from the core to the fueling floor valve is accomplished by a BLTC.

At block 2606, once the core component is positioned within the cleaning vessel, the fueling floor valve is closed, thus creating a sealed chamber within the cleaning vessel.

At block 2608, cleaning fluid may be introduced into the cleaning vessel, such as by the process inlets located within the receiver. The cleaning fluid may be any suitable fluid, and in some cases may include a water-laden inert gas. The cleaning fluid may additionally or alternatively include a liquid, such as water, that may react with the residual sodium and remove it from the core assembly. The cleaning fluid flow may be reversible to cause cleaning fluid to pass through the core assembly in more than one direction, as desired.

In some cases, one or more sensors may be used to determine the any off gassing from the cleaning process. For example, the amount of hydrogen generated during the cleaning process may be determined and used to indicate when the cleaning process is completed. In some cases, a continuous measurement of the generated hydrogen may indicate that the cleaning process is nearing completion as the generated hydrogen levels approach a threshold, such as zero.

At block 2610, the cleaning vessel is moved down the elevator into the spent fuel pool. As described elsewhere herein, once the cleaning vessel moves away from the receiver, the cleaning vessel may be open at its top end and water from the spent fuel pool may enter the cleaning vessel. The cleaning vessel may additionally be partially submerged in the spent fuel pool during the cleaning operation, thus providing passive cooling of the cleaning vessel during the cleaning process.

At block 2612, the core component is positioned within the spent fuel pool for storage. In some cases, the cleaning vessel may be received at the bottom of the elevator, such as by a PIC trolley, where it may be conveyed to a storage location, such as a SFP racks within the spent fuel pool. The core assembly may then be removed from the cleaning vessel, such as by a crane or pool handling machine, and positioned for storage within the PIC racks.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising."

A processor may be configured with instructions to perform any one or more steps of any method as disclosed herein.

As used herein, the term "or" is used inclusively to refer items in the alternative and in combination.

As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. A sodium removal machine for cleaning a discharged core assembly, comprising:
   a receiver coupled to a fueling floor valve, the receiver having one or more process fluid couplings;
   a cleaning vessel configured to receive and retain a spent fuel assembly, the cleaning vessel having an open upper end configured to sealingly couple with the receiver and a closed lower end, wherein the cleaning vessel is configured to be at least partially submerged in a spent fuel pool during cleaning; and
   an elevator configured to convey the cleaning vessel containing the spent fuel assembly from an upper position in which the cleaning vessel is sealingly coupled to the receiver to form a substantially enclosed cleaning chamber having controlled fluid inlet and outlet paths, to a lower position in which the cleaning vessel is decoupled from the receiver, and the open upper end of the cleaning vessel is submerged within the pool to allow water from the pool to enter the cleaning vessel.

2. The sodium removal machine as in claim 1, wherein the receiver is static and, when coupled to the cleaning vessel, creates an enclosed boundary for the discharged core assembly.

3. The sodium removal machine as in claim 1, wherein the cleaning vessel includes a receptacle configured to receive a portion of the discharged core assembly, the receptacle configured to form a seal with the portion of the discharged core assembly.

4. The sodium removal machine as in claim 1, wherein the one or more process fluid couplings comprises a process fluid inlet positioned above the cleaning vessel, such that process fluid passing through the process fluid inlet enters the cleaning vessel and core assembly.

5. The sodium removal machine as in claim 1, wherein the receiver has a first cross-sectional dimension, and the core assembly has a second cross-sectional dimension, and wherein the first cross-sectional dimension is less than twice the second cross-sectional dimension.

6. The sodium removal machine as in claim 1, wherein the receiver has a first length, and the core assembly has a second length, and wherein the first length is less than two times the second length.

7. The sodium removal machine as in claim 1, wherein the elevator selectively couples with the cleaning vessel, and wherein the elevator automatically decouples from the cleaning vessel when the elevator is in the lower position.

8. The sodium removal machine as in claim 1, further comprising a fuel canister configured to replace the cleaning vessel and engage with the elevator, the fuel canister further configured to receive a failed fuel assembly having a breached cladding for delivery to the lower position and long-term storage of the failed fuel assembly within the fuel canister.

9. The sodium removal machine as in claim 1, further comprising a trolley configured to receive the cleaning vessel from the elevator at the lower position and transport the cleaning vessel containing the spent fuel assembly to a storage location within the spent fuel pool.

10. The sodium removal machine as in claim 1, wherein the cleaning vessel comprises:
   an upper receptacle configured to maintain alignment of the spent fuel assembly with a longitudinal axis of the cleaning vessel; and
   a lower plenum chamber for collecting cleaning fluid that has passed through the spent fuel assembly.

11. The sodium removal machine as in claim 1, wherein the elevator comprises a carriage having a handling feature that automatically releases the cleaning vessel when the carriage travels beyond a frame of the elevator.

* * * * *